US011328236B2

(12) United States Patent
Tokuchi

(10) Patent No.: US 11,328,236 B2
(45) Date of Patent: May 10, 2022

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 111 days.

(21) Appl. No.: 16/262,938

(22) Filed: Jan. 31, 2019

(65) Prior Publication Data
US 2020/0012994 A1  Jan. 9, 2020

(30) Foreign Application Priority Data
Jul. 9, 2018  (JP) .............................. JP2018-130172

(51) Int. Cl.
| G06F 3/0484 | (2022.01) |
| G06Q 10/06 | (2012.01) |
| G06F 3/04847 | (2022.01) |
| G06F 3/04817 | (2022.01) |

(52) U.S. Cl.
CPC ... *G06Q 10/063116* (2013.01); *G06F 3/0484* (2013.01); *G06F 3/04817* (2013.01); *G06F 3/04847* (2013.01); *G06Q 10/0639* (2013.01)

(58) Field of Classification Search
CPC .. G06F 3/048; G06F 3/04817; G06F 3/04847; G06Q 10/0639
See application file for complete search history.

(56) References Cited

U.S. PATENT DOCUMENTS

| 2004/0056980 A1 | 3/2004 | Miyagawa et al. |
| 2009/0043632 A1* | 2/2009 | Ricketts ........... G06Q 10/06314 |
| | | 705/7.21 |
| 2009/0089129 A1* | 4/2009 | Polson ................. G06Q 10/109 |
| | | 705/7.22 |
| 2011/0239158 A1* | 9/2011 | Barraclough ........... G06F 9/451 |
| | | 715/808 |
| 2012/0204123 A1* | 8/2012 | Bauer .................. G06Q 10/109 |
| | | 715/772 |
| 2013/0198600 A1* | 8/2013 | Lockhart ............... G06F 40/169 |
| | | 715/230 |
| 2013/0311946 A1* | 11/2013 | Kwon .................. G06Q 10/109 |
| | | 715/811 |
| 2014/0280292 A1* | 9/2014 | Skinder ............... G06F 16/3338 |
| | | 707/767 |
| 2015/0286357 A1* | 10/2015 | Penha ................... G06F 3/0485 |
| | | 715/830 |
| 2016/0226930 A1* | 8/2016 | Zhang ................. H04L 65/1093 |
| 2016/0275458 A1* | 9/2016 | Meushar ............ G06Q 10/1095 |
| 2018/0091459 A1* | 3/2018 | Bastide .................... H04L 51/18 |
| 2018/0284957 A1* | 10/2018 | Afsari ................... H04L 65/403 |

FOREIGN PATENT DOCUMENTS

| JP | 2004080215 | 3/2004 |
| JP | 4027800 | 12/2007 |
| JP | 2011022706 | 2/2011 |

* cited by examiner

*Primary Examiner* — Xuyang Xia
(74) *Attorney, Agent, or Firm* — JCIPRNET

(57) ABSTRACT

An information processing apparatus includes a display control unit that displays diagrams representing contents corresponding to a schedule of a user based on information indicating the schedule.

24 Claims, 17 Drawing Sheets

FIG. 2

| | 7/16/2018 | 7/17/2018 | 7/18/2018 | 7/19/2018 | 7/20/2018 | 7/21/2018 | 7/22/2018 |
|---|---|---|---|---|---|---|---|
| 8:00 | | PAPERWORK: TRANSPORTATION EXPENSES ADJUSTMENT OF OUTDOOR SERVICE LAST WEEK | | | | | FAMILY TRIP AT KARUIZAWA |
| 9:00 | MEETING MEETING ATTENDEE: A, B, C, MYSELF AGENDA: ABOUT ENHANCEMENT OF PRODUCT A | | | | | | |
| 10:00 | | MEETING MEETING ATTENDEE: A, MYSELF, N FROM ANOTHER COMPANY α AGENDA: ABOUT NEW JOINT PROJECT PLANNING | | | | | |
| 11:00 | | | SEMINAR CONTENT: ABOUT MARKETING METHOD PLACE: TOKYO, MINATO WARD, ○○ BUILDING | EXHIBITION CONTENT: ADVANCED TECHNOLOGY OF AR, VR PLACE: KANAGAWA PREFECTURE, YOKOHAMA CITY, △△ | DOCUMENT PREPARATION CONTENT: SALE STRATEGY OF PRODUCT A PLACE: WORKING AT HOME | FAMILY TRIP AT KARUIZAWA | |
| 12:00 | (LUNCH BREAK) | (LUNCH BREAK) | | | | | |
| 13:00 | DOCUMENT PREPARATION CONTENT: PLANNING MATERIAL OF PRODUCT B | PREPARE REPORT OF MORNING MEETING | | | | | |
| 14:00 | | MEETING MEETING ATTENDEE: A, MYSELF, N FROM ANOTHER COMPANY α | | | | | |
| 15:00 | ASSIGNMENT HANDLING CONTENT: THINK ABOUT HANDLING OF ASSIGNMENT ASSIGNED IN MEETING OF PRODUCT C LAST WEEK. | | | | | | |
| 16:00 | | CONSULTATION CONSULTANT: C CONTENT: SECRET | | | | | |
| 17:00 | | | SOCIAL GATHERING PLACE: TOKYO, MINATO WARD, ○○ BUILDING DUES: 3000 YEN | WELCOME PARTY FOR NEW EMPLOYEE PLACE: KANAGAWA PREFECTURE, YOKOHAMA CITY, □□ (CHINESE CUISINE) DUES: 5000 YEN | DOCUMENT PREPARATION CONTENT: SUMMARIZE CONTENTS OF SEMINAR AND EXHIBITION | | HAVE HOLIDAY AT HOME |
| 18:00 | SCHEDULED TO LEAVE WORK | PREPARATORY SCHEDULE: HANDLING OF ASSIGNMENT ASSIGNED IN YESTERDAY MEETING. | | | | | |
| 19:00 | | | | | | | |

| PROJECT: Q | PERSON IN CHARGE | PROGRESS | DETERMINATION | TOTAL | FILE STORAGE |
|---|---|---|---|---|---|
| FUNCTION A | YAMADA | 55% START DATE: 10/6/2017 LAST TIME: 6/1/2018 | SMOOTH | SMOOTH PROGRESS PERCENTAGE 48% | FILE A LATEST UPDATE DATE: 6/5/2018 UPDATE COUNT: 13 |
| | SATO | 41% LAST TIME | LATE | | FILE B LATEST UPDATE DATE: 5/20/2018 UPDATE COUNT: 6 |
| FUNCTION B | YAMADA | | SMOOTH | SMOOTH PROGRESS PERCENTAGE 60% | FILE C LATEST UPDATE DATE: 6/1/2018 UPDATE COUNT: 10 |
| | KATAKURA | | FAST | | FILE D LATEST UPDATE DATE: 6/7/2018 UPDATE COUNT: 17 |
| FUNCTION C | SASAHARA | | SMOOTH | SMOOTH PROGRESS PERCENTAGE 52% | FILE E LATEST UPDATE DATE: 6/5/2018 UPDATE COUNT: 12 |
| ENTIRE PROJECT | HARANISHI | | SMOOTH | SMOOTH PROGRESS PERCENTAGE 53% | (FILE A TO E) |

FIG. 13A
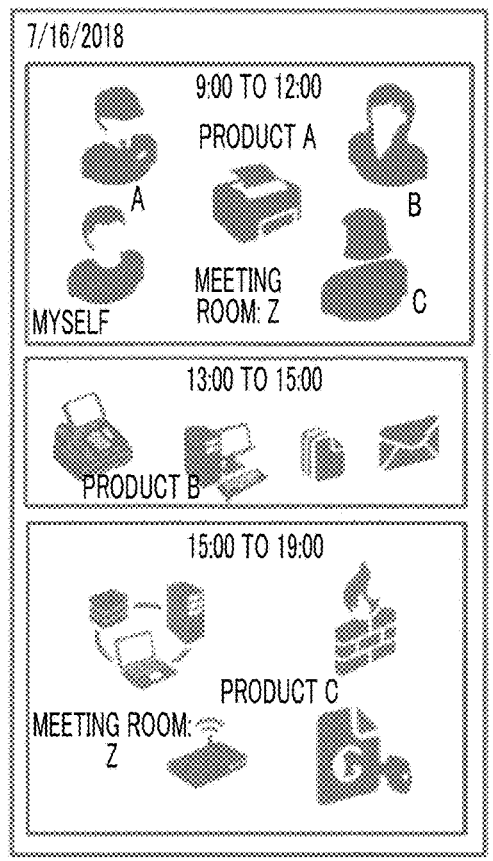
FIG. 13B
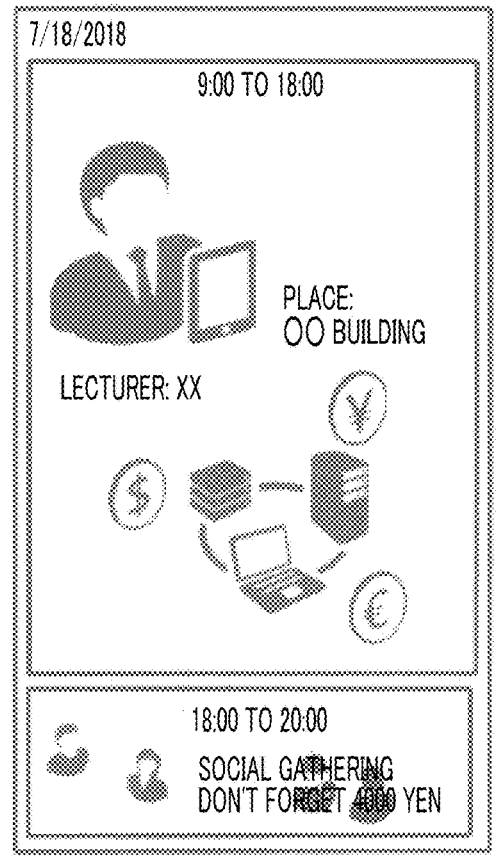
FIG. 13C
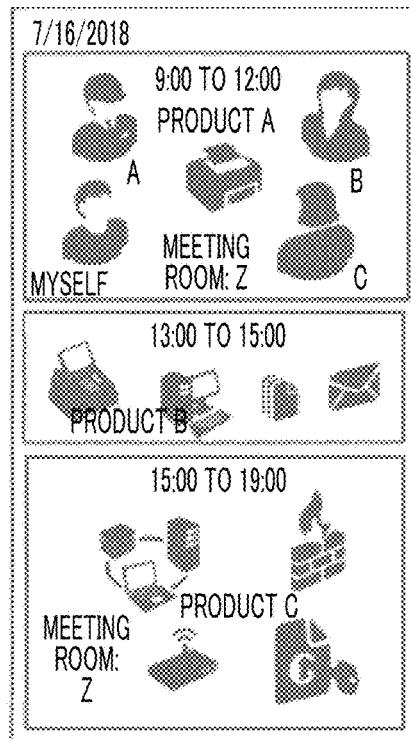
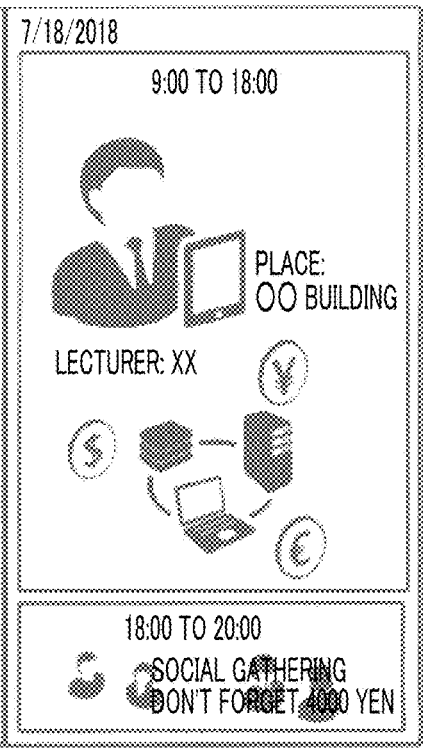

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2018-130172 filed Jul. 9, 2018.

BACKGROUND (i) Technical Field

The present invention relates to an information processing apparatus and a non-transitory computer readable medium storing an information processing program.

(ii) Related Art

In the related art, software (application) that manages a schedule or progress of a user has been known. For example, JP2011-22706A discloses a schedule management system that reflects positional information indicating a current position of a user on a schedule.

SUMMARY

Incidentally, there is a need to grasp an outline of the schedule or progress of the user earlier than checking all information items indicating the schedule or progress.

Aspects of non-limiting embodiments of the present disclosure relate to a technology capable of grasping an outline of a schedule or progress of a user earlier than checking all information items indicating the schedule or progress of the user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a display control unit that displays one or more diagrams representing contents corresponding to a schedule of a user based on information indicating the schedule.

BRIEF DESCRIPTION OF THE DRAWINGS

Exemplary embodiment(s) of the present invention will be described in detail based on the following figures, wherein:

FIG. 2 is a diagram showing an example of schedule information;

FIG. 3 is a diagram showing an example of progress information;

FIGS. 10A and 10B are diagrams showing a case where the schedule information is updated according to editing of the semantic diagram;

FIGS. 13A to 13C are diagrams showing a second example of the combination diagram obtained by combining the plurality of semantic diagrams;

DETAILED DESCRIPTION

Schematic Configuration of Information Processing Apparatus

Figure 1:
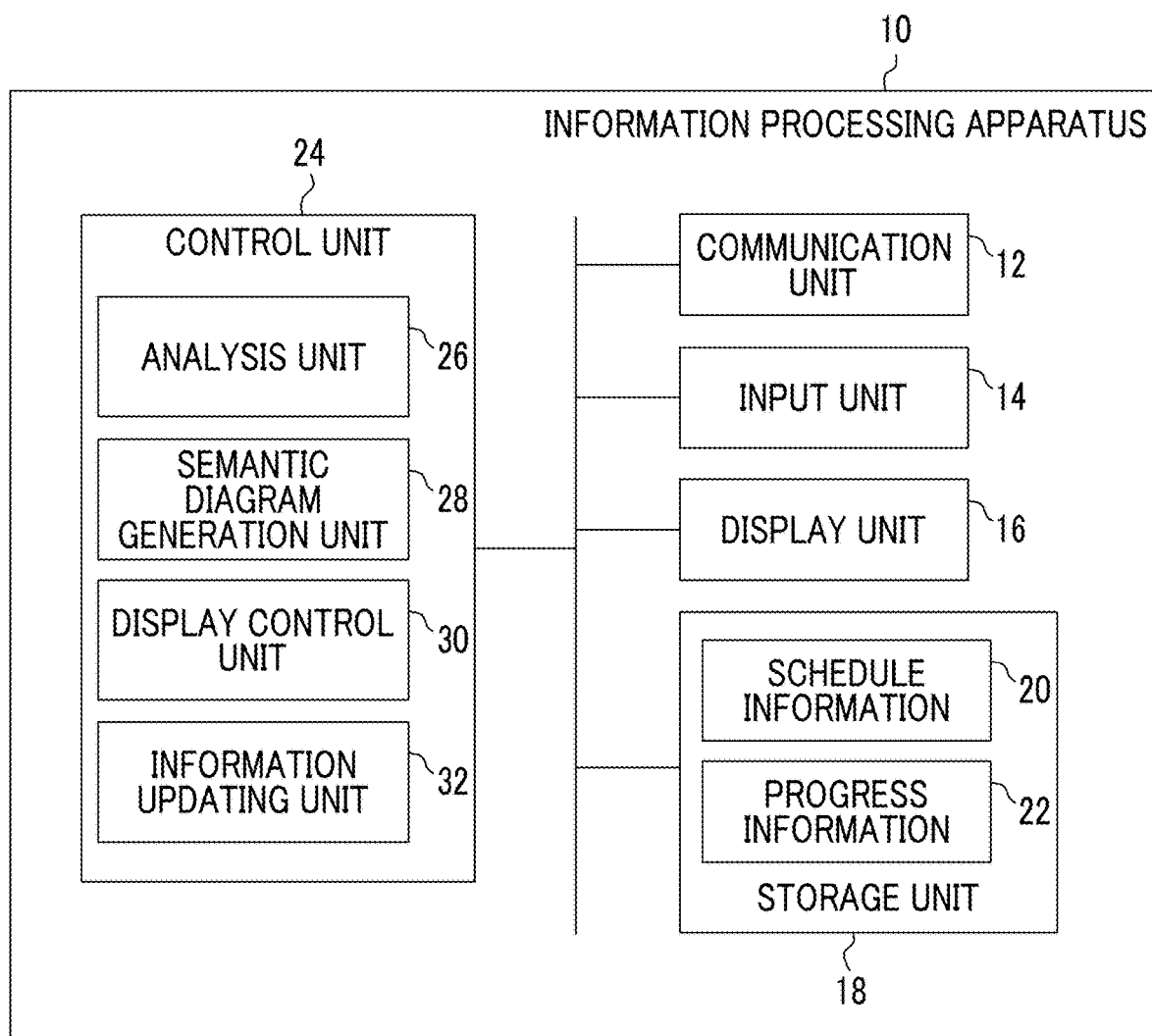
FIG. 1 is a schematic configuration diagram of an information processing apparatus according to the present exemplary embodiment.

FIG. 1 is a schematic configuration diagram of an information processing apparatus 10 according to the present exemplary embodiment. Examples of the information processing apparatus 10 include a personal computer, a mobile terminal such as a tablet, and a server, and the information processing apparatus 10 may be any apparatus as long as the apparatus can realize the following functions.

A communication unit 12 includes, for example, a network adapter. The communication unit 12 has a function of communicating with another apparatus (for example, a user terminal used by a user) through a communication line such as a LAN or the Internet. The user terminal may be a personal computer or a mobile terminal such as a tablet.

An input unit 14 includes, for example, a touch panel, a keyboard, a voice input, or a mouse. The input unit 14 may include an interface that receives voice or a non-contact operation (gesture) using a camera, or a sensor. The input unit 14 is used for inputting an instruction of the user for the information processing apparatus 10.

A display unit 16 includes, for example, a liquid crystal panel. Various screens are displayed, particularly, a processing result of a control unit 24 to be described below are displayed on the display unit 16.

In a case where the information processing apparatus 10 is the server, the information processing apparatus 10 may include the input unit 14 and the display unit 16. In this case, the communication unit 12 receives input information indicating an input of the user for the user terminal (that is, the communication unit 12 functions as the input unit 14), and the communication unit 12 transmits display instruction information for displaying a screen on a display unit of the user terminal to the user terminal (that is, the display unit of the user terminal functions as the display unit 16).

A storage unit 18 includes, for example, a ROM, a RAM, or a hard disk. An information processing program for operating the units of the information processing apparatus 10 is stored in the storage unit 18. As shown in FIG. 1, schedule information 20 and progress information 22 are stored in the storage unit 18.

The schedule information 20 is information indicating a schedule of the user. The schedule information 20 is obtained by any method. For example, the user inputs his or her schedule to a schedule management software (application) that operates on the information processing apparatus 10 or the user terminal, and thus, the schedule information is stored in the storage unit 18. The schedule information 20 of a certain user can be browsed by another user.

FIG. 2 shows an example of the schedule information 20. FIG. 2 corresponds to one user, and shows the schedule of the one person. As shown in FIG. 2, information indicating an event to be scheduled by the user is included in the schedule information 20. The information indicating the event includes a scheduled execution time of the event and the content of the event. In the present exemplary embodiment, the scheduled execution time of the event is defined by a scheduled start time and a scheduled completion time of the event, but may be prescribed by other methods. For example, the scheduled execution time of the event may be prescribed by the scheduled start time of the event and a scheduled time spent on the event.

For example, the schedule information 20 of FIG. 2 indicates that the user is scheduled to attend an event "meeting" from 9:00 to 12:00 on Jul. 16, 2018. The information indicating the content of the meeting includes attendees (person "A", "B", "C", and "myself") and the agenda for the meeting (enhancement of product A). The information indicating the content of the meeting may include a material (attached file) to be used at the meeting. The attached file may be an electronic file. The attached file is not limited to a document file, and may be a voice file or a video file. An event may be executed over several days. For example, in the example of FIG. 2, the schedule information 20 includes an event "family trip at Karuizawa" from 8:00 on Jul. 21, 2018 to 14:00 on Jul. 22, 2018.

The user can set the event included in the schedule information 20 to be private. For example, in a case where the user sets a specific event as secret event in the schedule management application, the event is set to be private. In the example of FIG. 2, an event from 17:00 to 18:00 on Jul. 17, 2018 is set as the secret event, and this event is set to be private.

A plurality of schedule information items 20 corresponding to plural users may be stored in the storage unit 18. A schedule for one week is shown in FIG. 2, but the schedule included in the schedule information 20 is not limited to the schedule for one week. A schedule for only some time of a day is shown in FIG. 2, but a schedule for 24 hours may be included in the schedule information 20.

The progress information 22 is information indicating progress of a plurality of users. Similarly to the schedule information 20, the progress information 22 is also obtained by any method. For example, each user inputs the progress of his or her schedule to progress management software (application) that operates on the information processing apparatus 10 or the user terminal, and thus, the progress information is stored in the storage unit 18. The progress information 22 is commonly used between the users, and can be browsed by each user. As will be described below, a browsable range may be determined by the user.

The progress information 22 may be information indicating progress of a plurality of tasks. The progress information 22 is not limited thereto, and may be information indicating business progress of the user in the present exemplary embodiment. The progress information 22 according to the present exemplary embodiment may indicate business progress of one project constituted by a plurality of tasks engaged by a plurality of users.

FIG. 3 shows an example of the progress information 22. The progress information 22 shown in FIG. 3 indicates business progress related to a project "Ω". The project "Ω" includes a task functioning as "function A", a task functioning as "function B", and a task functioning as "function C". Each task is assigned a person in charge, and shows the business progress of each person in charge. In the example of FIG. 3, the business progress is shown by a percentage of the completed business to the entire business to be performed by each person in charge in each task. Other indices may be used as an index of the business progress.

The progress information 22 includes a completion due date of each task. Information indicating determination for the business progress for each person in charge and for each task, which is determined based on the completion due date of each task and the business progress of each person in charge is included in the progress information 22. Examples of the determination include "fast", "good", and "delay".

Information indicating a storage of a file related to each person in charge is included in the progress information 22. Examples of the file related to each person in charge include a business file of each task or a business daily report.

The business progress of each person in charge changes from moment to moment, and each person in charge intermittently inputs and updates the business progress thereof to the progress management software. Information indicating an updating time of the business progress of each person in charge may be included in the progress information 22. The progress information 22 shown in FIG. 3 shows that a person in charge, "Yamada", updates the business progress on Jun. 1, 2018.

Supplementary information may be included in the progress information 22. The supplementary information includes, for example, supplementary user information related to a user who engages the task indicated by the progress information 22 or supplementary progress information related to progress of the task indicated by the task information. As the supplementary user information is information indicating a condition of the user. For example, the supplementary user information is information indicating that the user is in a bad condition or the user is free. The supplementary progress information is information indicating a progress method of the business for the task in the future or a problem related to the task. For example, the supplementary progress information is information indicating that the user starts to develop a certain module from now. The supplementary information may be input by the user to the progress management application. The control unit 24 to be described below may analyze the content of the report prepared by the user, and thus, the supplementary information may be obtained.

In the present exemplary embodiment, the schedule information 20 and the progress information 22 are stored in the information processing apparatus 10. These information items may be stored in another apparatus as long as the information processing apparatus 10 can access these information items.

The control unit 24 includes, for example, a CPU or a microcontroller. The control unit 24 controls the units of the information processing apparatus 10 according to the information processing program stored in the storage unit 18. As shown in FIG. 1, the control unit 24 functions as an analysis unit 26, a semantic diagram generation unit 28, a display control unit 30, and an information updating unit 32.

The analysis unit 26 obtains the meaning (content) of the schedule information by analyzing the schedule information 20. The analysis unit 26 obtains the meaning (content) of the progress information 22 by analyzing the progress information 22. Specifically, the analysis unit 26 obtains the meaning of the schedule information 20 or the progress information 22 by performing natural language processing on a character string extracted from the schedule information or the progress information.

The natural language processing is processing including morphological analysis, syntactic analysis, semantic analysis, or context analysis.

The morphological analysis is processing for dividing the character string into a plurality of morphemes (the smallest unit of meaning in a language) based on information such as grammar of target language and a word's part of speech called dictionary and determining a word's part of speech of each morpheme.

The syntactic analysis is processing for determining a syntactic relationship such as a relationship between a plurality of morphemes (for example, a modifier-modificand relationship) and determining a positional relationship between the plurality of morphemes by using the syntactic relationship. A syntax tree (a tree structure having each morpheme as a node) having a plurality of patterns is formed through the syntactic analysis.

The semantic analysis is processing for determining a correct connection between the plurality of morphemes based on the meaning of each morpheme with consideration for the meaning of each morpheme. A semantically correct syntax tree is selected from the syntax tree having the plurality of patterns through the semantic analysis.

The context analysis is processing for performing the syntactic analysis and the semantic analysis on a sentence constituted by one or a plurality of morphemes. For example, the content of a demonstrative pronoun appearing in a second sentence is grasped based on the content of a first sentence through the context analysis.

The analysis unit 26 may specify one or a plurality of particularly meaning parts for each event included in the schedule information 20 through the natural language processing. Alternatively, the analysis unit 26 may specify a priority of each event included in the schedule information 20. The analysis unit 26 may specify one or a plurality of particularly meaning parts for each task included in the progress information 22 through the natural language processing.

The analysis unit 26 can analogize the content of a specific event included in the schedule information 20 from the content of another event included in the schedule information 20. For example, in the schedule information 20 shown in FIG. 2, "the contents of a seminar and an exhibition are summarized" is written as the content in an event "document preparation" from 19:00 on Jul. 20, 2018. However, the schedule information does not specify what kind of seminar or exhibition it is. In such a case, for example, the analysis unit 26 specifies that the seminar or the exhibition where the user attends in the latest past of the event is a document preparation target. In the example of FIG. 2, a seminar on Jul. 18, 2018 is specified as the seminar, and an exhibition on Jul. 19, 2018 is specified as the exhibition.

The semantic diagram generation unit 28 generates a semantic diagram representing the content corresponding to at least apart of the schedule information 20 based on the meaning of the schedule information 20 obtained by the analysis unit 26. The semantic diagram generation unit 28 generates a semantic diagram representing the content corresponding to at least apart of the progress information 22 based on the meaning of the progress information 22 obtained by the analysis unit 26.

In the present exemplary embodiment, the semantic diagram generation unit 28 generates a semantic diagram corresponding to the schedule indicated by the schedule information 20. Specifically, since the event that defines the scheduled execution time is included in the schedule information 20 as stated above, the semantic diagram generation unit 28 generates the semantic diagram for each event. The semantic diagram generation unit 28 generates a plurality of semantic diagrams corresponding to the plurality of events included in the schedule information 20.

In the present exemplary embodiment, the semantic diagram generation unit 28 generates a semantic diagram corresponding to the task included in the progress information 22. The semantic diagram generation unit 28 generates a plurality of semantic diagrams corresponding to the plurality of tasks included in the progress information 22.

An example of the semantic diagram is a diagram that can ascertain a relationship between terms included in a part of the schedule information 20 or the progress information 22 as a generation target of the semantic diagram, for example, a relationship between a subject (who), a predicate (what did), and an object (what). The semantic diagram includes one or a plurality of components. The component is a figure, a photograph, or a text. For example, the semantic diagram includes a combination of a component representing the subject, a component representing the predicate, and a component representing the object.

The display control unit 30 performs a process of displaying various screens on the display unit 16. Particularly, the display control unit 30 displays the semantic diagram generated by the semantic diagram generation unit 28 on the display unit 16. In a case where a browsing request from the user is received, the display control unit 30 displays the semantic diagram on the display unit 16 or the display unit of the user terminal used by the user. The display control unit 30 displays various notifications for the user on the display unit 16. As stated above, the display control unit 30 functions as a notification control unit.

The information updating unit 32 performs a process of updating the schedule information 20 and the progress information 22, that is, changing the contents thereof. The information updating unit 32 updates the schedule information 20 or the progress information 22 in response to the operation of the user for the schedule management application or the progress management application. As described above, the semantic diagram displayed by the display control unit 30 can be edited by the user. In a case where the semantic diagram is edited by the user, the information updating unit 32 updates the schedule information 20 or the progress information 22 according to the edited content.

The schematic configuration of the information processing apparatus 10 is as described above. Hereinafter, the details of the processes of the semantic diagram generation unit 28, the display control unit 30, and the information updating unit 32 will be described.

Process of Displaying Semantic Diagram Based on Schedule Information

Figure 4:
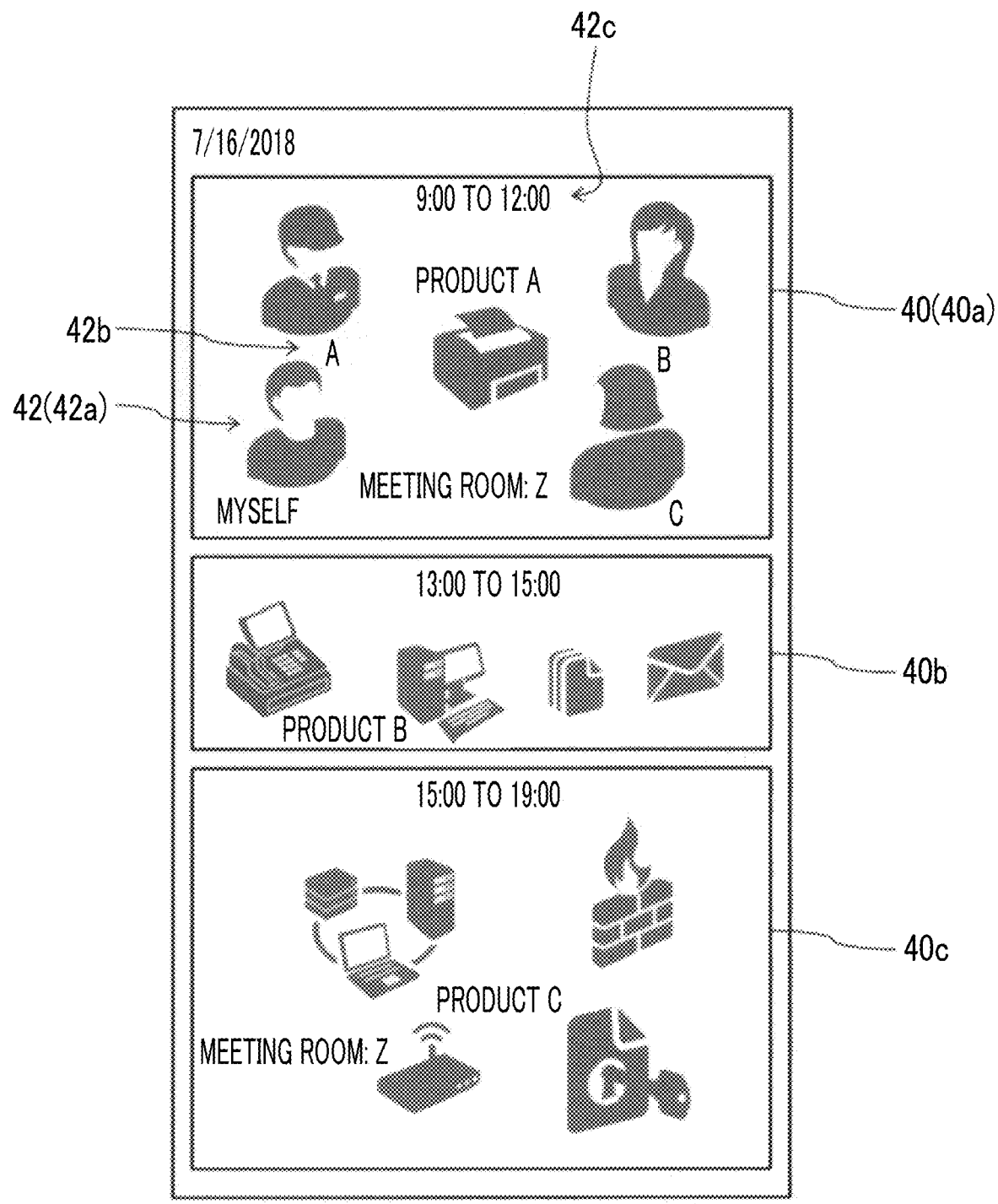
FIG. 4 is a diagram showing a display example of a semantic diagram representing a schedule of a user.

Initially, the process of displaying the semantic diagram generated based on the schedule information 20 will be described. FIG. 4 shows an example of a semantic diagram 40 which is generated by the semantic diagram generation unit 28 based on the schedule information 20 and is displayed on the display unit 16 by the display control unit 30.

The semantic diagram 40 shown in FIG. 4 corresponds to schedule information on Jul. 16, 2018 in the schedule information 20 shown in FIG. 2. Since the plurality of events is registered on Jul. 16, 2018, a plurality of semantic diagrams corresponding to a plurality of events is displayed. Specifically, a semantic diagram 40a corresponding to an event "meeting", a semantic diagram 40b corresponding to an event "document preparation", and a semantic diagram 40c corresponding to an event "assignment handling" are displayed. In the schedule indicated by the schedule information 20, a period during which the semantic diagram 40 is displayed as a target is described in "display target period". In the example of FIG. 4, the display target period is one day on Jul. 16, 2018.

A length of the display target period may be appropriately set by the user. For example, a plurality of semantic diagrams 40 corresponding to events for two days may be displayed. The display target period may be switched by the user operation. For example, in a case where the user operates (for example, touches the screen) from the state of FIG. 4, the display target period is switched to the next day, and a plurality of semantic diagrams 40 corresponding to a plurality of events on Jul. 17, 2018 may be displayed.

As mentioned above, the semantic diagram 40 includes one or a plurality of components 42. In a case where the semantic diagram 40a is described as an example, since the semantic diagram 40a represents the content of the meeting, the semantic diagram includes, as the component 42, a FIG. 42a representing an attendee of the meeting or a product A which is an agenda and a text 42b representing an attendee name, a product name, or a meeting room. The semantic diagram 40a includes, as the component 42, a text 42c representing a scheduled execution time of the meeting. As stated above, the semantic diagram 40 is displayed, and the user browses the semantic diagram. Thus, the user can grasp the outline of the content of the meeting more quickly and intuitively.

The display control unit 30 displays the plurality of semantic diagrams 40 corresponding to the plurality of events like frames of a manga. In this example, a display position of each semantic diagram 40 is determined according to the scheduled execution time of the corresponding event such that a time series of the events is displayed. In the example of FIG. 4, the plurality of semantic diagrams 40a to 40c is arranged from the top in order of the scheduled execution times of the corresponding events.

The display control unit 30 displays each semantic diagram 40 with a size corresponding to the length of the scheduled execution time of the event corresponding to the semantic diagram 40. The size of the semantic diagram 40 means an area of a display region of the semantic diagram 40. For example, since the scheduled execution time of the event corresponding to the semantic diagram 40a is from 9:00 to 12:00, that is, 3 hours, the scheduled execution time of the event corresponding to the semantic diagram 40b is from 13:00 to 15:00, that is, 2 hours, and the scheduled execution time of the event corresponding to the semantic diagram 40c is from 15:00 to 19:00, that is, 4 hours, the display control unit 30 displays the semantic diagram 40c with the largest size, displays the semantic diagram 40b with the smallest size, and displays the semantic diagram 40a with a medium size between the sizes of the semantic diagrams 40b and 40c, among the three semantic diagrams 40a to 40c. Accordingly, the user can intuitively grasp the length of the scheduled execution time of each event.

The display control unit 30 may display the semantic diagram 40 corresponding to some events in the display target period. That is, the display control unit 30 may display the semantic diagrams 40 corresponding to all the events included in the display target period. In the present exemplary embodiment, the display control unit 30 does not display the semantic diagram 40 corresponding to the event of which a priority is relatively low obtained by the analysis unit 26, even if the event is within the display target period. The display control unit 30 may not display the semantic diagram 40 corresponding to the event of which the priority is equal to or less than a threshold value, even if the event is within the display target period. Examples of the event having the low priority include lunch break or routine work. Examples of the routine work include an event such as mail check performed every morning. A case where the display control unit 30 does not display the semantic diagram 40 is a concept including both a case where the semantic diagram generation unit 28 generates the semantic diagram 40 and the display control unit 30 does not display the generated semantic diagram and a case where the semantic diagram generation unit 28 does not generate the semantic diagram 40 and the display control unit 30 does not display the semantic diagram of course. As stated above, the semantic diagram 40 corresponding to the event having the low priority is not displayed, and thus, it is possible to display the semantic diagram 40 corresponding to the event having a relatively high priority with a larger size.

The display control unit 30 does not display the semantic diagram 40 corresponding to the event which is set to be private in the schedule information 20. In the schedule information 20 of FIG. 2, for example, since the event from 17:00 to 18:00 on Jul. 17, 2018 is set to be private, the display control unit 30 does not display the semantic diagram 40 corresponding to the event which is set to be private even in a case where the period of Jul. 17, 2018 is selected as the display target period. In a case where a person who browses the semantic diagram 40 is a person who prepares the corresponding schedule information 20, the display control unit 30 may display the semantic diagram 40 corresponding to the event which is set to be private. Incidentally, a user ID indicating the person who prepares the semantic diagram may be included in the schedule information 20. The display control unit 30 can determine whether or not the person who browses the semantic diagram and the person who prepares the semantic diagram are the same person by authenticating the user before the information processing apparatus 10 displays the semantic diagram 40.

The display control unit 30 may control a display manner of the semantic diagram 40 according to an execution status of the event corresponding to the semantic diagram 40.

Specifically, the display control unit 30 may display the semantic diagram 40 corresponding to an event being executed by the user in an identifiable form. In this example, the display control unit 30 may specify the event of which the scheduled execution time includes the current time as the event being executed by the user. The display control unit may specify the event of which execution start information for the event is input by the user on the information processing apparatus 10 by the schedule management application, as the event being executed.

The display control unit 30 may display the semantic diagram 40 corresponding to the event completed by the user in the identifiable form. In this example, the display control unit 30 may specify the event of which the scheduled execution time of the event is before the current time as the completed event. The display control unit may specify the event of which execution completion information for the event is input by the user on the information processing apparatus 10 by the schedule management application, as the completed event.

Figure 5:
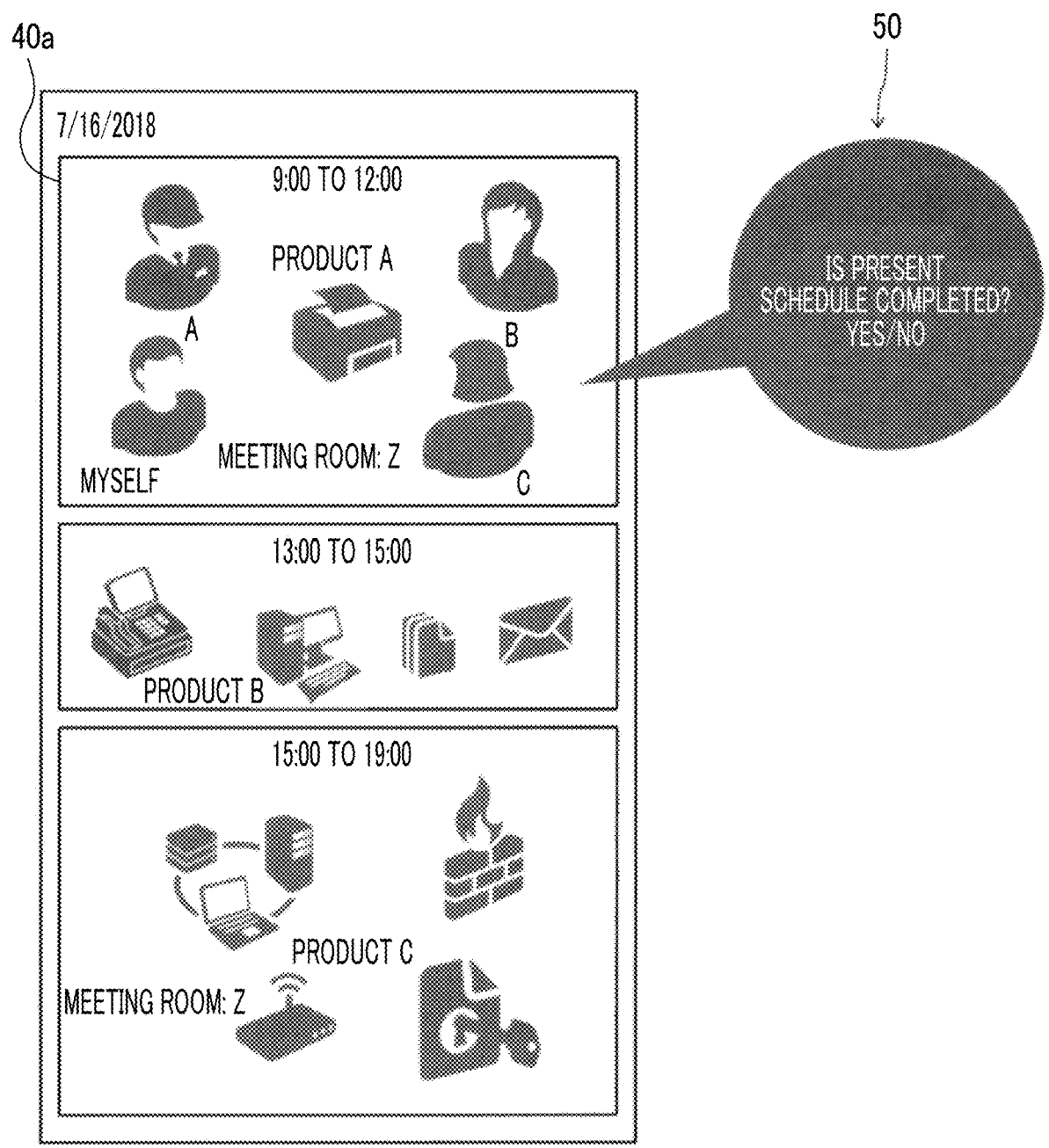
FIG. 5 is a diagram showing a screen for inquiring about whether or not an event is completed.

The user may input the execution start information or the execution completion information on the screen on which the semantic diagram 40 is displayed. For example, the display control unit 30 may associate the event with the corresponding semantic diagram 40 and may display a notification for inquiring of the user about whether or not the execution of the event is completed before and after the execution completion time of the event (for example, five minutes ago or five minutes later). FIG. 5 shows a pop-up 50 for the semantic diagram 40a as such as notification. Such a notification may be performed with voice instead of or in addition to the displaying using the display control unit 30. In this case, the control unit 24 that performs a voice notification functions as a notification control unit. In a case where the user inputs "YES" for the notification, the display control unit 30 determines that the execution of the event is completed, changes a display form of the semantic diagram 40 corresponding to the event.

The same is true of the execution start information. For example, the display control unit 30 may associate the event with the corresponding semantic diagram 40 and may display a notification for inquiring of the user about whether or not the execution of the event is started before and after of the execution start time of the event (for example, five minutes ago or five minutes later). In a case where the user inputs information indicating that the execution of the event is started for the notification, the display control unit 30 determines that the event is being executed.

Various forms are considered as the display form in which the semantic diagram 40 is identifiable. For example, it is considered that pixel values of pixels (hue or lightness) constituting the semantic diagram 40 as a target are values different from those of another semantic diagram 40 as a whole. For example, the semantic diagram 40 may gray out by increasing the lightness of the pixels constituting the semantic diagram 40 corresponding to the event being executed as a whole and changing the hue of the semantic diagram 40 corresponding to the completed event. Of course, a display form in which the semantic diagram 40 is displayed in a color indicating the execution of the event is not started yet is displayed such as a gray color before the execution of the event is started and the semantic diagram 40 is changed to a specific color indicating that the event is being executed from the color indicating that the execution of the event is not started yet in a case where the execution thereof is started may be used.

Figure 6:
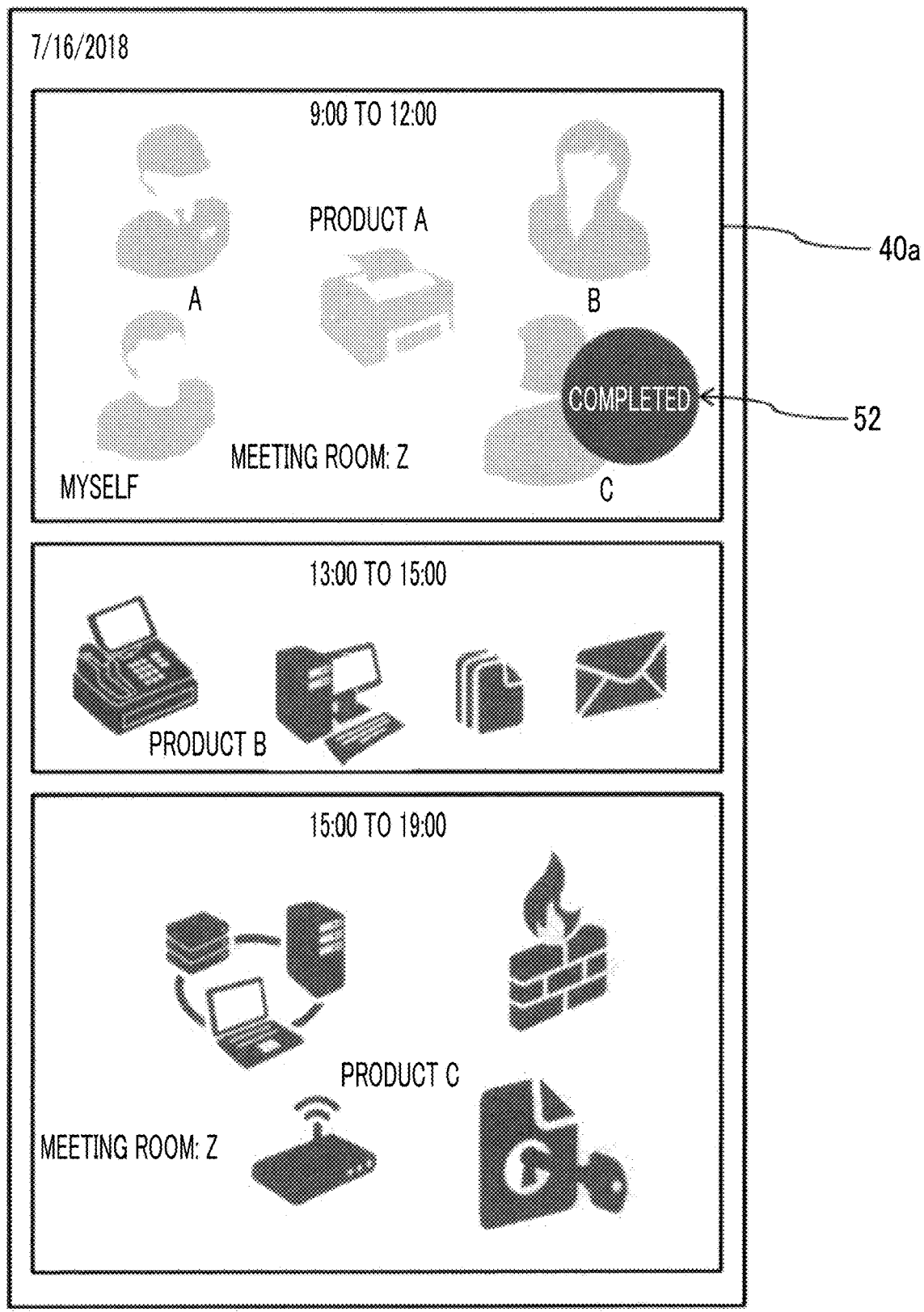
FIG. 6 is a diagram showing a display example of a semantic diagram corresponding to the completed event.

Alternatively, an icon indicating that the event corresponding to the semantic diagram 40 is being executed may be explicitly displayed. Similarly, an icon indicating that the execution of the event corresponding to the semantic diagram 40 is completed may be explicitly displayed. For example, an icon 52 including a text of "completed" is added to the semantic diagram 40a corresponding to the completed event, as shown in FIG. 6.

Figure 7:
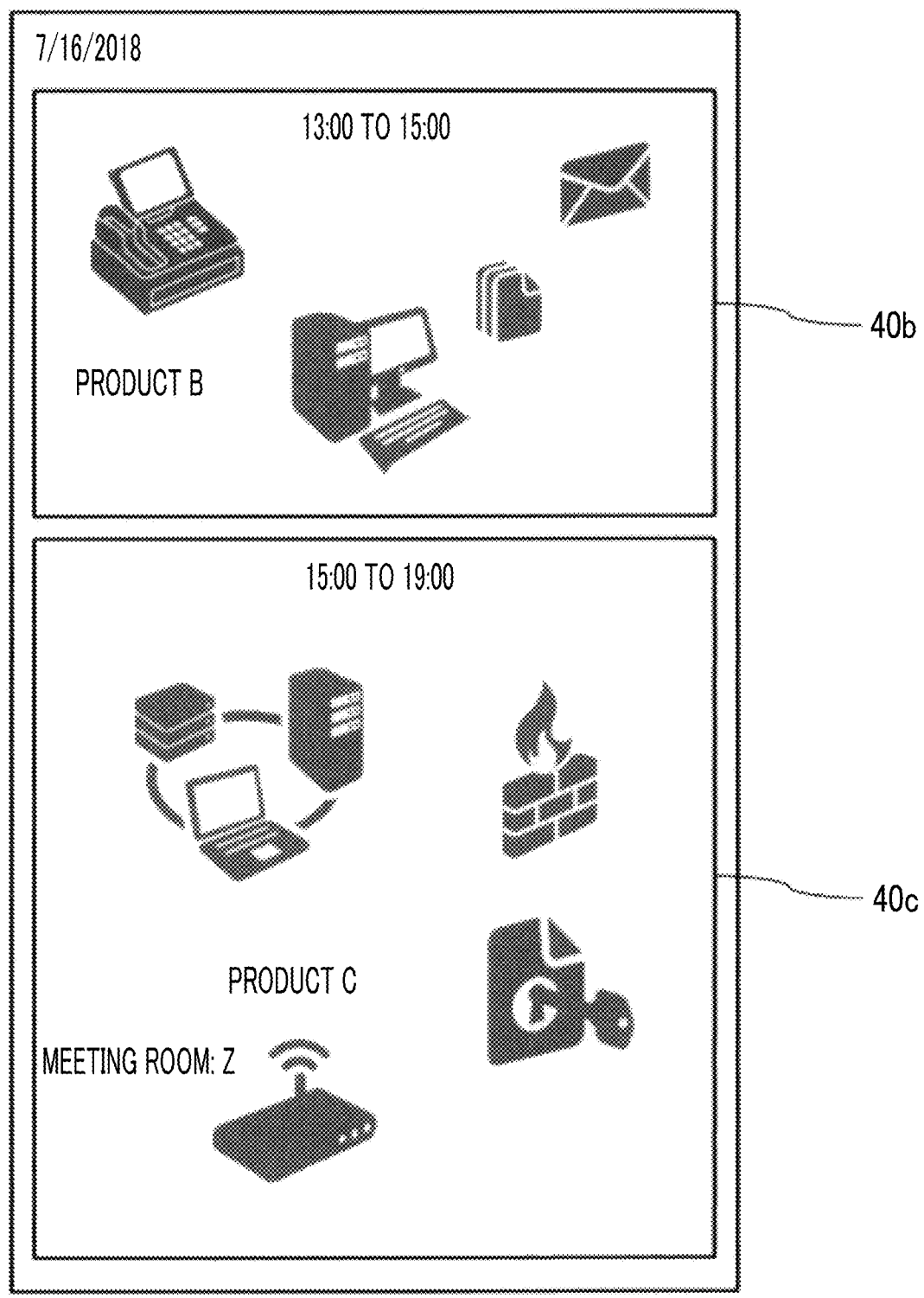
FIG. 7 is a diagram showing a display example after the semantic diagram corresponding to the completed event is hidden.

The display control unit 30 may hide the semantic diagram 40 corresponding to the event completed by the user. Since a space is formed by hiding the semantic diagram 40, for example, the display control unit 30 enlarges the remaining semantic diagram 40 after hiding the semantic diagram 40 corresponding to the completed event. For example, in the example of FIG. 6, in a case where the execution of the event corresponding to the semantic diagram 40a is completed, the display control unit 30 enlarges the remaining semantic diagrams 40b and 40c such that the space in which the semantic diagram 40a is displayed after hiding the semantic diagram 40a, as shown in FIG. 7. In this case, since the display regions of the semantic diagrams 40b and 40c increase, the semantic diagram generation unit 28 may regenerate the semantic diagrams 40b and 40c, and the display control unit 30 may display new semantic diagrams 40b and 40c having larger components 42 (that is, in which more detail contents are expressed).

Figure 8:
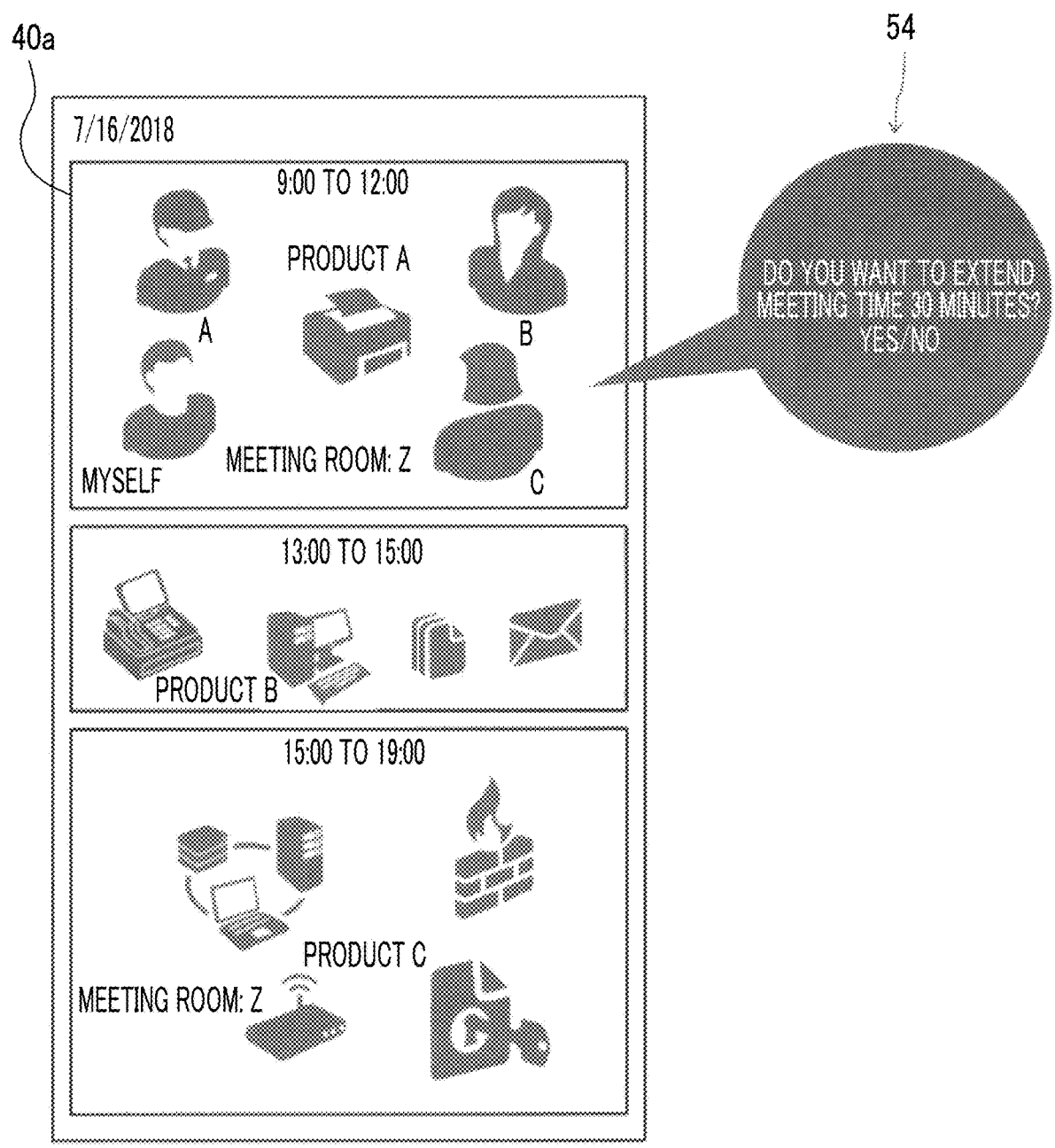
FIG. 8 is a diagram showing an example of a screen for inquiring about whether or not to change a scheduled execution time of the event.

As shown in FIG. 5, in a case where the notification for inquiring of the user about whether or not the execution of the event is completed is displayed and a case where the user inputs that the execution thereof is not completed for the notification (for example, a case where "NO" for the pop-up 50 of FIG. 5 is selected), the display control unit 30 may further display a notification for inquiring of the user about whether or not to extend the scheduled execution time of the event. FIG. 8 shows a pop-up 54 for the semantic diagram 40a as such a notification. The pop-up may also be performed with voice instead of or in addition to the displaying using the display control unit 30.

In a case where the user inputs an intention of extending the scheduled execution time thereof (for example, a case where "YES" is selected for the pop-up 54 of FIG. 8), the display control unit 30 changes the content of the component 42 indicating the scheduled execution time included in at least one of the semantic diagram 40 corresponding to the event selected for extending the scheduled execution time thereof or the semantic diagram. 40 corresponding to a subsequent event (specifically, of which the scheduled execution time is temporally after that of the event) to the selected event.

Figure 9:
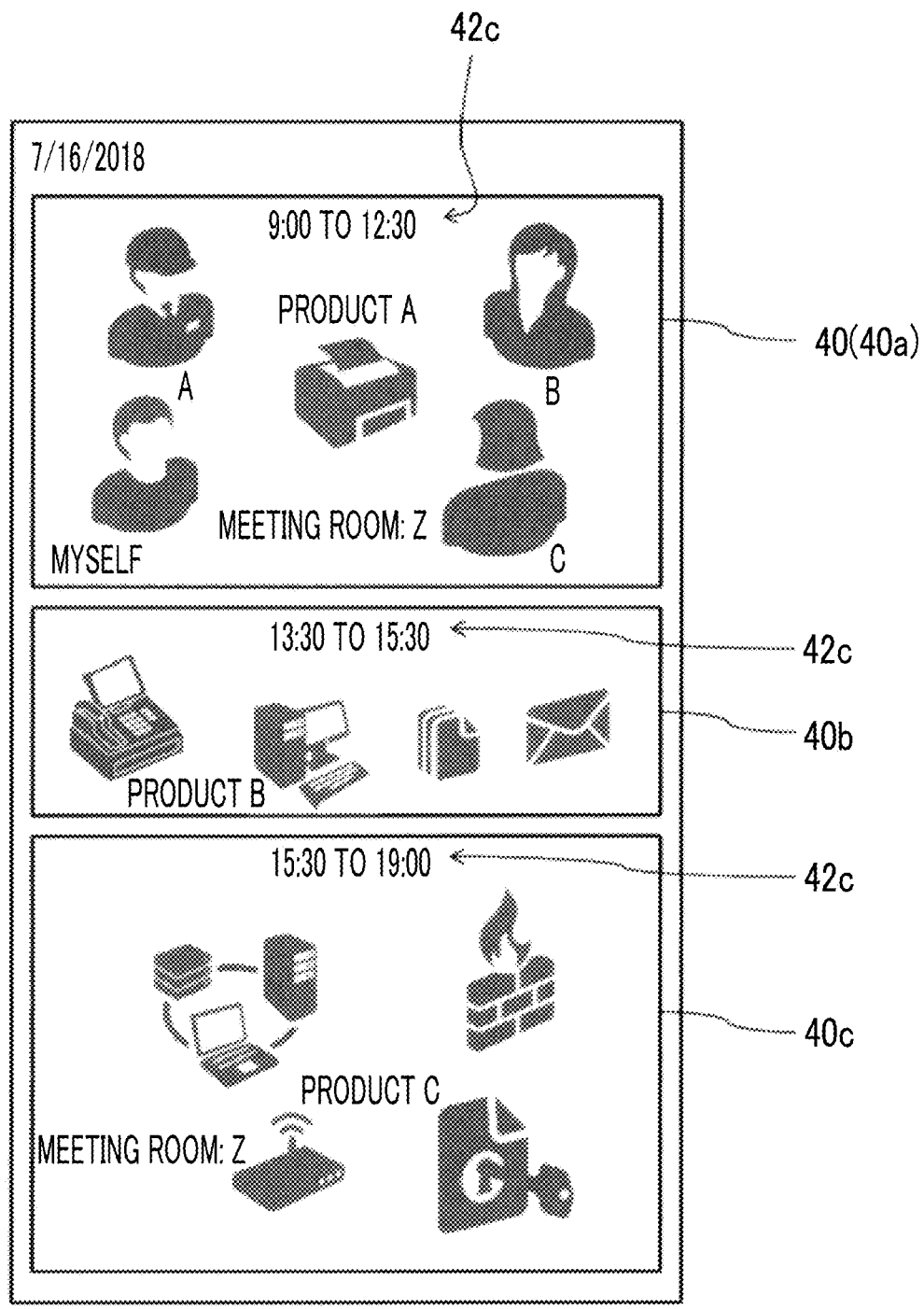
FIG. 9 is a diagram showing a display example of the semantic diagram after the scheduled execution time of the event is changed.

For example, in a case where the user selects "YES" for the pop-up 54 of FIG. 8 for inquiring about "do you want to extend time about 30 minutes?", the display control unit 30 changes the content of the text 42c which is the component 42 indicating the scheduled execution time included in the semantic diagram 40a to "9:00~12:30" from "9:00~12:00". The changed semantic diagram 40a is shown in FIG. 9. As stated above, as for the scheduled execution time of the semantic diagram 40a related to the notification (pop-up 54), only the scheduled completion time is changed without changing the scheduled start time.

The display control unit 30 also changes the content of the component 42 indicating the scheduled execution time included in the semantic diagrams 40b and 40c subsequent to the semantic diagram 40a. Specifically, the content of the text 42c included in the semantic diagram 40b is changed to "13:30~15:30" from "13:00~15:00". The changed semantic diagram 40b is shown in FIG. 9. As stated above, as for the scheduled execution time of the semantic diagram 40b subsequent to the semantic diagram 40a related to the notification (pop-up 54), the scheduled start time and the scheduled completion time are changed.

Similarly, the content of the text 42c included in the semantic diagram 40c is changed to "15:30~19:00" from "15:00~19:00". The changed semantic diagram 40b is shown in FIG. 9. In this example, the reason why the user does not extend the scheduled completion time of the semantic diagram 40c is that a scheduled time to leave work is determined to be 19:00. As mentioned above, in a case where the scheduled completion time of the event or the subsequent event is determined not to be changeable, the display control unit 30 does not change the scheduled completion time of the content of the component 42 included in the semantic diagram 40 corresponding to the event or the subsequent event.

After the semantic diagram generation unit 28 generates the semantic diagram 40 based on the schedule information 20 and the display control unit 30 displays the semantic diagram 40, in a case where the information updating unit 32 changes the content of the schedule information 20 based on an instruction of the user, the semantic diagram generation unit 28 regenerates the semantic diagram 40 based on the varied schedule information 20 (changed schedule information 20), and the display control unit 30 displays the regenerated semantic diagram 40. As stated above, the display control unit 30 updates the semantic diagram 40 according to the change to the schedule information 20.

For example, in a case where semantic diagram 40a is displayed as shown in FIG. 4 and in a case where the user edits the schedule information 20 to remove person "B" from the attendees of the meeting, the semantic diagram generation unit 28 regenerates the semantic diagram 40a which does not include the component 42 corresponding to person "B", and the display control unit 30 displays the regenerated semantic diagram 40a. The display control unit 30 updates the semantic diagram 40 even in a case where the scheduled execution time of the event corresponding to the displayed semantic diagram 40 is changed. Incidentally, the schedule information 20 shown in FIG. 2 represents the schedule of a certain user (the user expressed as "myself" among the attendees of the meeting which is the event corresponding to the semantic diagram 40a). However, in a case where person "B" is removed from the attendees of the meeting which is the event corresponding to the semantic diagram 40a as described above, both the schedule information of the user and the schedule information 20 of person "B" may be edited. In this case, the schedule of the meeting from 9:00 to 12:00 on Jul. 16, 2018 is removed from the schedule information 20 of person "B". At this time, for example, the control unit 24 may notify the user that the schedule information 20 is updated, for example. In this example, the control unit notifies person "B" that the schedule information 20 of person "B" is updated.

The semantic diagram 40 is updated according to the variation of the schedule information 20, and thus, the content of the schedule information 20 and the content of the semantic diagram 40 match each other. As a result, it is possible to prevent a discrepancy between these contents.

The semantic diagram 40 displayed on the display unit 16 may be editable by the user. For example, the user may remove the component 42 included in the semantic diagram 40 or in a case where the component 42 is the text, the user may edit the content thereof. In a case where the semantic diagram 40 is edited by the user, since the content represented by the semantic diagram 40 is changed of course, the information updating unit 32 updates the content of the event corresponding to the semantic diagram 40 of the schedule information 20 according to the edit made to the semantic diagram 40 by the user.

Figures 10A, 10B:
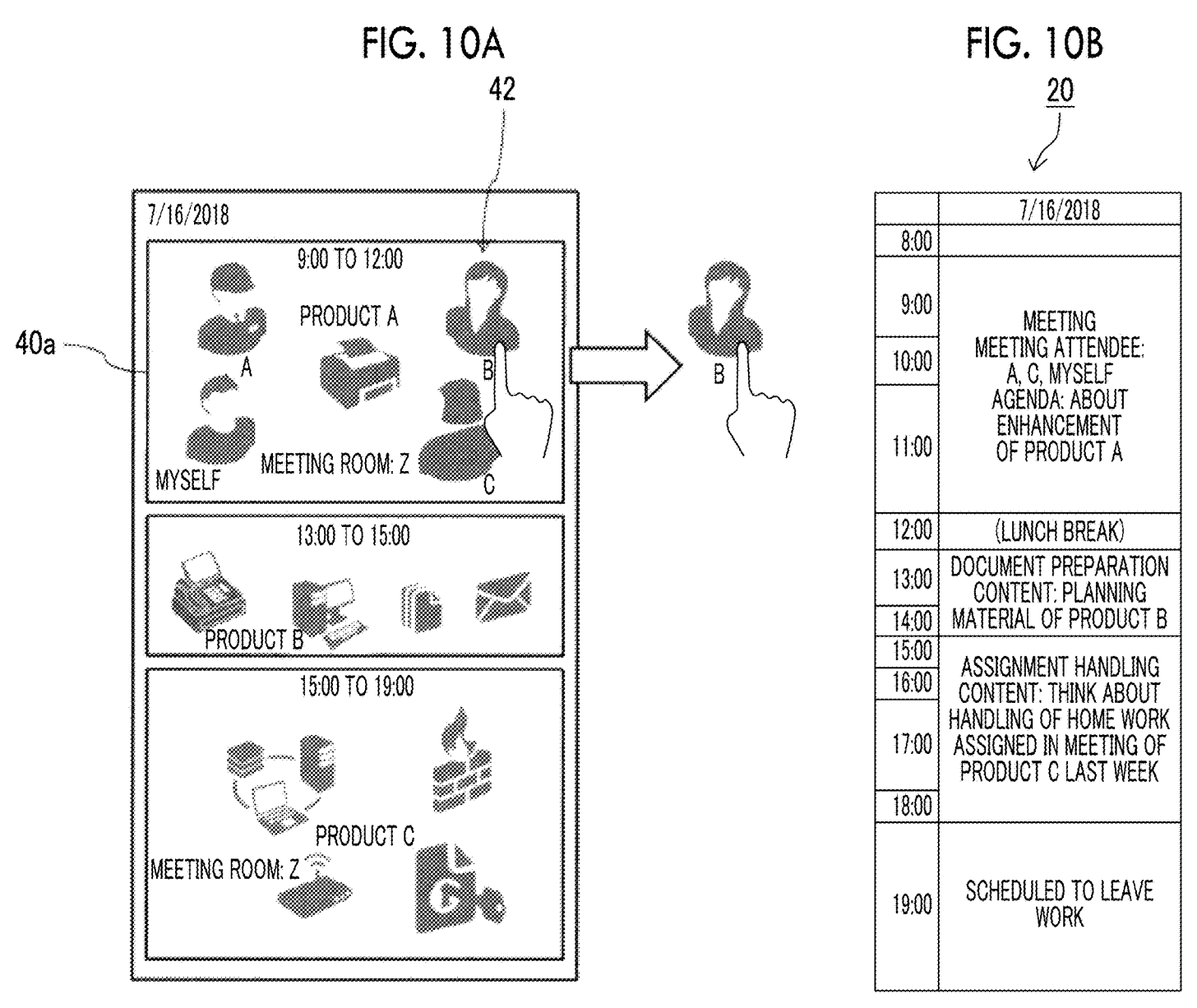

For example, in a case where the user performs an operation on the semantic diagram 40a and the component 42 representing person "B" is consequently removed from the semantic diagram 40a as shown in FIG. 10A, the display control unit 30 display a new semantic diagram 40a which does not include the component 42, and the information updating unit 32 removes person "B" from the attendees of "meeting" on Jul. 16, 2018 which is the event corresponding to the semantic diagram 40a in the schedule information 20 as shown in FIG. 10B.

As shown in FIG. 10A, the user moves the component 42 to the outside of the display region of the semantic diagram 40 by performing a drag operation on the component 42, and thus, it is possible to remove the component 42 from the semantic diagram 40. Of course, the method of removing the component is not limited thereto, and a method of tapping or double-tapping the component 42 may be used.

Figure 11:
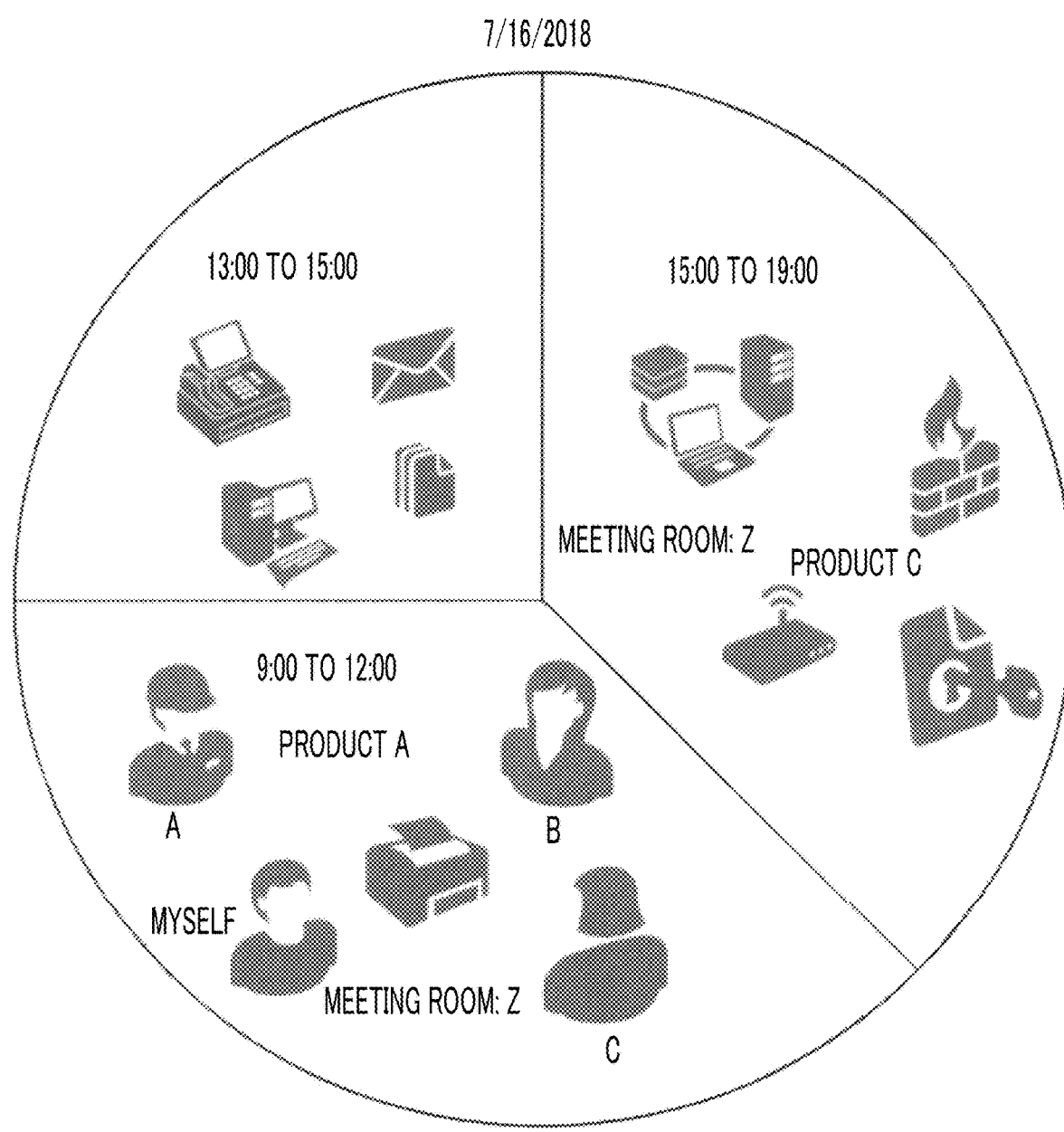
FIG. 11 is a diagram showing another display example of the semantic diagram representing the schedule of the user.

A shape (external shape) of a display frame of the semantic diagram 40 is not limited to a rectangular shape. For example, as shown in FIG. 11, the display control unit 30 may display the plurality of semantic diagrams 40 as a circular shape as a whole by respectively forming the external shapes of the plurality of semantic diagrams 40 in fan shapes.

The display control unit 30 may vary the shape of the display frame of the semantic diagram 40 to, for example, a shape according to the content of the event corresponding to the semantic diagram 40. For example, in a case where the plurality of events included in the display target period is circular tasks, the display control unit 30 displays the shape of each semantic diagram 40 in the fan shape such that the plurality of semantic diagrams 40 is formed in the circular shape as a whole as shown in FIG. 11.

Alternatively, the display control unit 30 may vary the shape of the display frame of the semantic diagram 40 to the shape according to the shape of the display unit 16. Since a display unit of a smartphone has a rectangular shape in general, the shape of the display frame of the semantic diagram 40 may be the rectangular shape in a case where the semantic diagram 40 is displayed on the smartphone. However, a shape of a display unit of a smart watch may be a circular shape, for example. In such a case, the display control unit 30 displays the shape of each semantic diagram 40 as the fan shape such that the display control unit 30 forms the plurality of semantic diagrams 40 in the circular shape as a whole, as shown in FIG. 11.

The shape of the display frame of the semantic diagram 40 may be set by the user. In this case, the display control unit 30 displays the shape of the display frame of the semantic diagram 40 as a shape corresponding to an instruction of the user.

Two or more semantic diagrams 40 may be combined into one semantic diagram by an operation performed on the displayed semantic diagrams. In a case where the user performs an operation for combining two or more semantic diagrams 40, the display control unit 30 may display a combination diagram obtained by combining the two or more semantic diagrams 40 in response to the operation.

Figure 12:
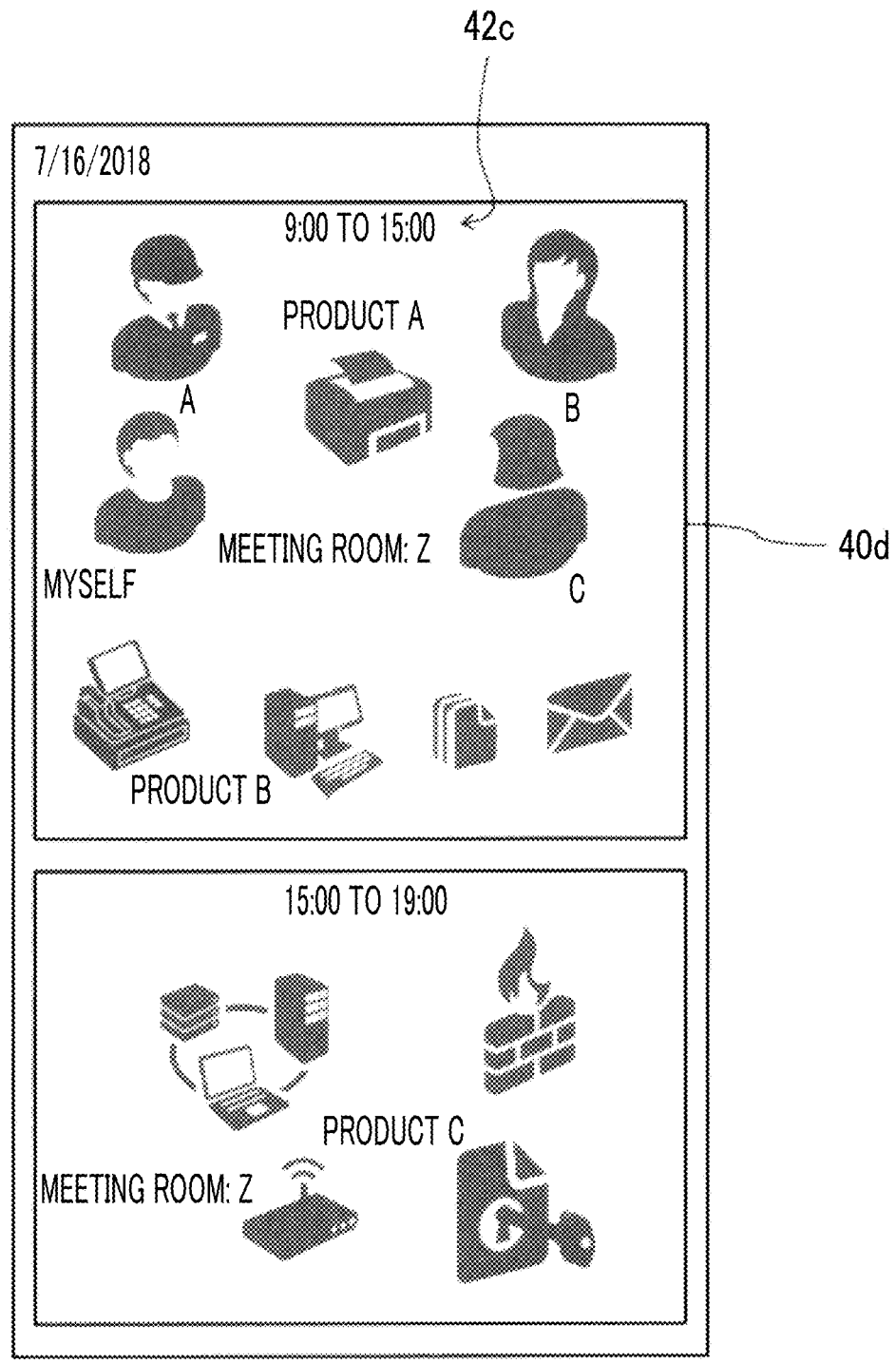
FIG. 12 is a diagram showing a first example of a combination diagram obtained by combining a plurality of semantic diagrams.

For example, in a case where the user performs an operation for combining the semantic diagram 40a and 40b in a state in which the semantic diagram 40a and 40b are displayed as shown in FIG. 4, the semantic diagram generation unit 28 may generate a combination diagram and the display control unit may display the generated combination diagram. The combination diagram 40d in FIG. 12 is an example of a combination diagram, which is a semantic diagram including both the content represented by the semantic diagram 40a, that is, the content of the event corresponding to the semantic diagram 40a, and the content represented by the semantic diagram 40b, that is, the content of the event corresponding to the semantic diagram 40b.

The combination diagram includes a combination diagram shown in FIG. 13C. That is, in a case where the user performs an operation for combining a first semantic diagram group shown in FIG. 13A with a second semantic diagram group shown in FIG. 13B, the display control unit 30 displays the combination diagram obtained by connecting the first semantic diagram group with the second semantic diagram group as shown in FIG. 13C.

IN a case where the semantic diagrams 40 of which the shapes of the display frames are different from each other are combined, the display control unit may display the shape of the display frame of the combination diagram as the shale of the display frame of one semantic diagram 40. The shape of the display frame of the combination diagram may be a shape based on the shapes of the display frames of both the semantic diagrams. For example, in a case where the plurality of semantic diagrams 40 of which the shape of the display frame is the circular shape as a whole and the semantic diagram 40 of which the shape of the display frame is the rectangular shape are combined, the shape of the display frame of the combination diagram may be an elliptical shape.

As the operation for combining the plurality of semantic diagrams 40, the user may perform an operation for moving one semantic diagram 40 to the display region of another semantic diagram 40 by dragging the one semantic diagram on the display unit 16. The operation for combining the plurality of semantic diagrams 40 is not limited thereto. For example, an operation for pinching one semantic diagram 40 and another semantic diagram 40 may be performed.

Process of Displaying Semantic Diagram Based on Progress Information

Figure 14:
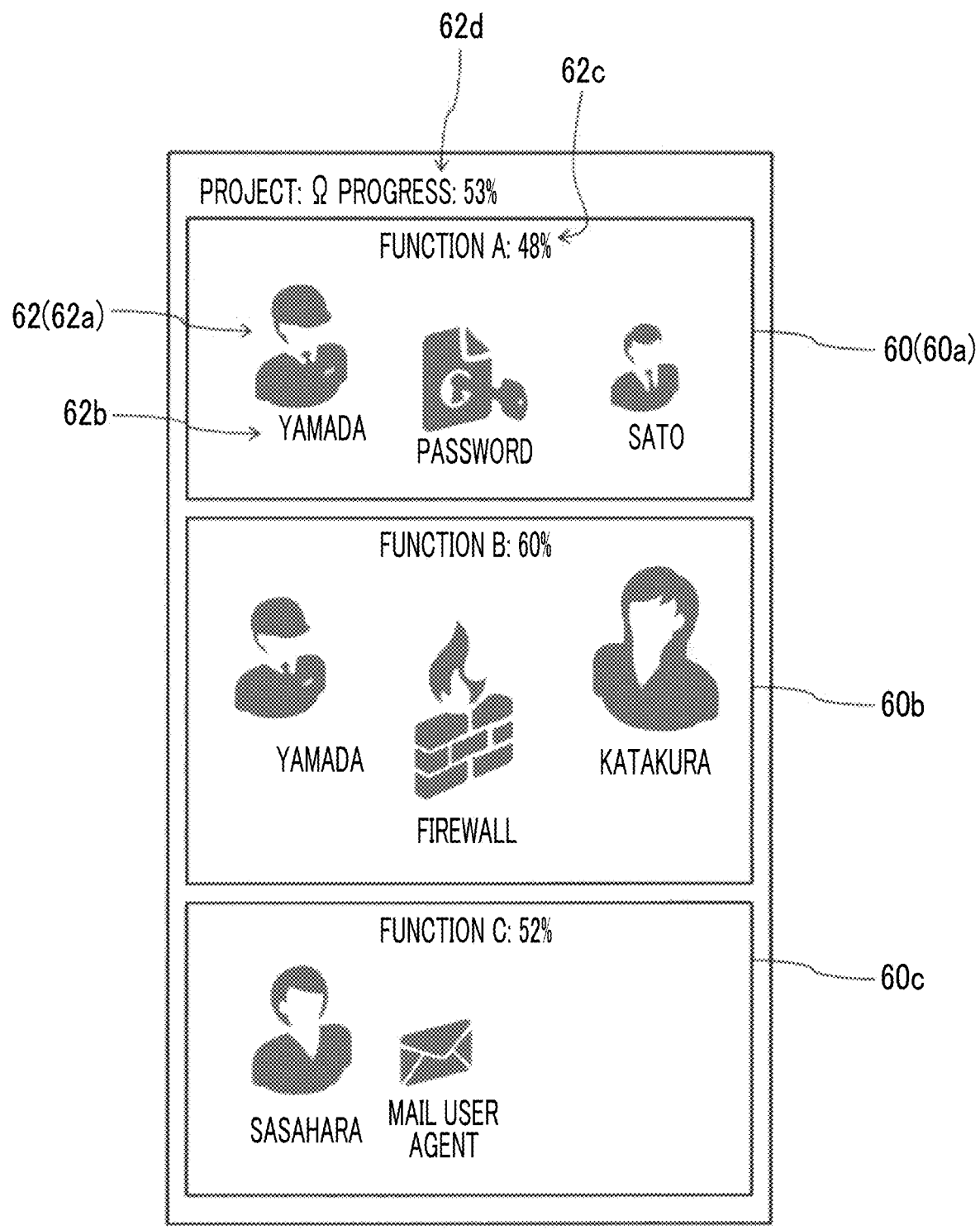
FIG. 14 is a diagram showing a first display example of a semantic diagram representing progress of a plurality of users.

Next, a process of displaying the semantic diagram generated based on the progress information 22 will be described. FIG. 14 shows an example of a semantic diagram 60 which is generated by the semantic diagram generation unit 28 based on the progress information 22 and is displayed on the display unit 16 by the display control unit 30.

The semantic diagram 60 shown in FIG. 14 is a semantic diagram corresponding to the progress information 22 shown in FIG. 3. The project Ω indicated by the progress information 22 shown in FIG. 3 includes the plurality of tasks, a plurality of semantic diagrams 60 corresponding to the plural tasks is displayed. Specifically, a semantic diagram 60a corresponding to a task "function A", a semantic diagram 60b corresponding to a task "function B", and a semantic diagram 60c corresponding to a task "function C" are displayed.

The semantic diagram 60 based on the progress information 22 also includes one or a plurality of components 62. In a case where the semantic diagram 60a is described as an example, the component 62 includes a FIG. 62a indicating a person in charge of the task "function A" or the function A and a text 62b indicating a name of a person in charge and a function name. The semantic diagram 60a includes, as the component 62, a text 62c indicating a progress percentage of the corresponding task. A component 62d indicating a progress percentage of the entire project corresponding to the progress information 22 together with each semantic diagram 60 corresponding to each task may be displayed. As stated above, the semantic diagram 60 is displayed, and the user browses the semantic diagram. Thus, the user can grasp the outline of the content of the progress more quickly and intuitively.

The display control unit 30 displays each semantic diagram 60 with a size corresponding to the progress of the task corresponding to the semantic diagram 60. For example, since a progress percentage of the task corresponding to the semantic diagram 60a is 48%, a progress percentage of the task corresponding to the semantic diagram 60b is 60%, and a progress percentage of the task corresponding to the semantic diagram 60c is 52%, the display control unit 30 displays the semantic diagram 60b with the largest size, displays the semantic diagram 60a with the smallest size, and displays the semantic diagram 60c with a medium size between the semantic diagram 60a and the semantic diagram 60b, among the three semantic diagrams 60a to 60c. Accordingly, the user can intuitively grasp the progress (percentage) of each task.

Figure 15:
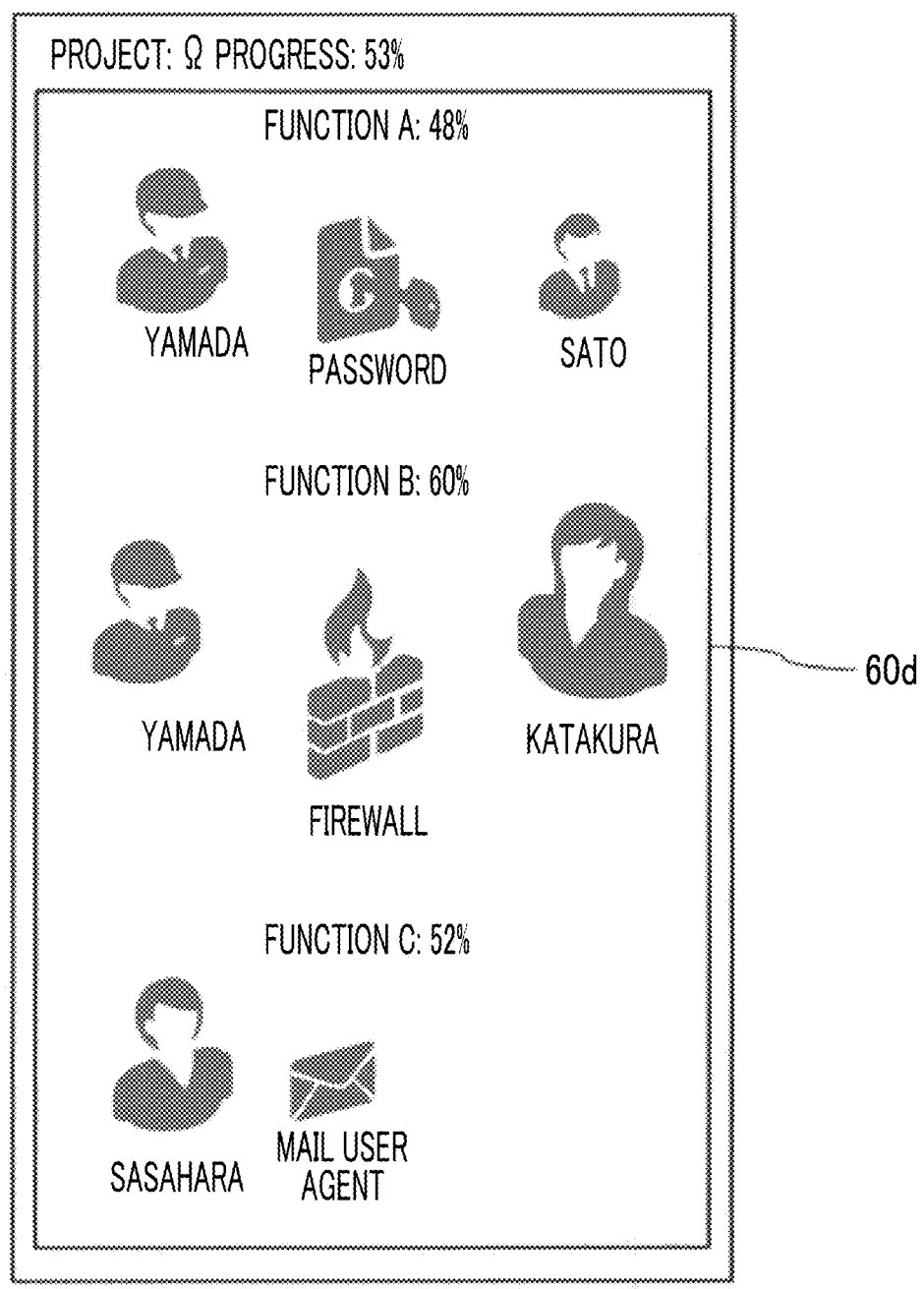
FIG. 15 is a diagram showing a second display example of the semantic diagram representing the progress of the plurality of users.

The semantic diagram generation unit 28 may generate one semantic diagram 60 representing the content of the entire project indicated by the progress information 22, and the display control unit 30 may display the generated semantic diagram. FIG. 15 shows such a semantic diagram 60d.

As shown in FIG. 3, there may be a plurality of persons in charge of one task in the project corresponding to the progress information 22. In such a case, the progress percentages may be different between the plurality of persons in charge of the same task. For example, in the example of FIG. 3, there are two names of "Yamada" and "Sato" as the persons in charge of the task "function A", and the progress percentages thereof are different from each other.

The display control unit 30 may display the component 62 representing each user in a display form corresponding to the progress of each user (each person in charge) in the semantic diagram 60. For example, in the semantic diagram 60a shown in FIG. 14, since the progress percentage (55%) of the person in charge "Yamada" is larger than the progress percentage (41%) of the person in charge "Sato" in the task "function A" corresponding to the semantic diagram 60a, the display control unit 30 displays the components such that the component 62 representing Yamada is larger than the component 62 representing Sato.

Various forms are considered as the display form corresponding to the progress of each person in charge. In contrast to the example described above, the component 62 representing a person in charge of which the progress percentage is higher may be displayed so as to be smaller. Alternatively, the pixel values of pixels corresponding to the components 62 may be changed. For example, the components may be displayed such that a color of the component 62 representing the person in charge of which the progress percentage is faster than scheduled is blue, a color of the component 62 representing the person in charge of which the progress percentage is on schedule is green, a color of the component 62 representing the person in charge of which the progress percentage is slightly slower than scheduled is yellow, and a color of the component 62 representing the person in charge of which the progress percentage is greatly slower than scheduled is red. In the example of FIG. 14, the semantic diagram 60 for each task is displayed. However, the semantic diagram generation unit 28 may further subdivide the semantic diagram 60 for each person in charge, and may represent the progress of each person in charge according to the size of the subdivided diagram.

Figure 16:
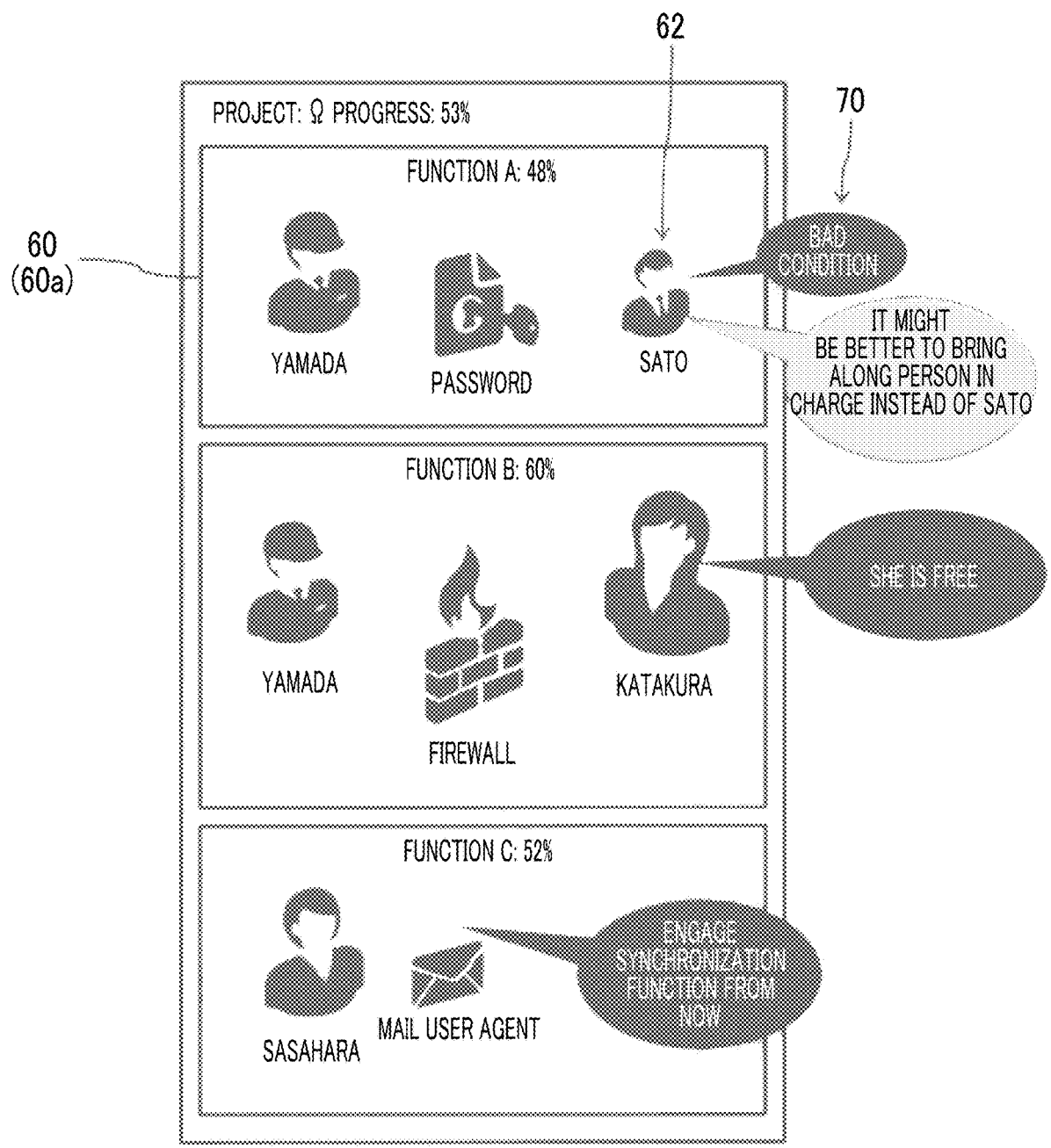
FIG. 16 is a diagram showing a display example of supplementary information.

As described above, the supplementary information may be included in the progress information 22. In a case where the supplementary information is included in the progress information 22, the semantic diagram generation unit 28 may generate the semantic diagram 60 including the content of the supplementary information, and the display control unit 30 may display the generated semantic diagram. FIG. 16 shows an example of the semantic diagram 60 including the content of the supplementary information. For example, in a case where the supplementary information indicates that the person in charge "Sato" is in a bad condition, the semantic diagram generation unit 28 associates the corresponding component 62 with Sato, and generates the semantic diagram 60a including a speech balloon 70 indicating the content of the supplementary information. The display control unit 30 displays the generated semantic diagram. The method of displaying the supplementary information is not limited thereto. The supplementary information may be displayed by other methods. For example, the user may set that which content of supplementary information is displayed.

The semantic diagram generation unit 28 may generate the semantic diagram including the component representing the entire project corresponding to the progress information 22, and the display control unit 30 may display the generated semantic diagram by changing the display form of the component representing the entire project according to the progress of the entire project. For example, in a case where the progress information 22 indicates progress of a project E for developing a multi-function printer, the semantic diagram generation unit 28 generates the semantic diagram 60 including the component representing the multi-function printer which is a developing target. The display control unit 30 displays the component 62 in a display form corresponding to a progress percentage of the entire project E indicated by the progress information 22.

Figure 17A:
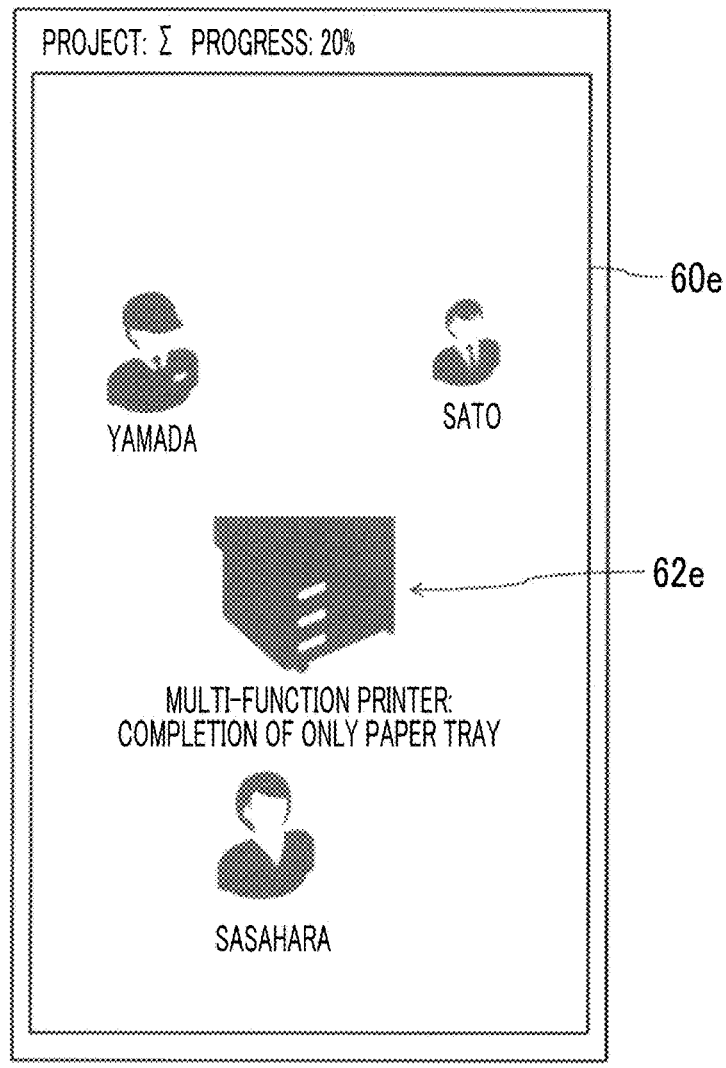
FIGS. 17A and 17B are diagrams showing a third display example of the semantic diagram representing the progress of the plurality of users.
Figure 17B:

FIG. 17A shows a semantic diagram 60e including a component 62e which represents the multi-function printer which is the developing target and is displayed in a display form corresponding to the progress percentage of the entire project E. The component 62e representing the multi-function printer originally has a shape shown in FIG. 17B. However, in the example of FIG. 17A, since the progress percentage of the multi-function printer is 20% and only a paper tray part is completed, the display control unit 30 displays only a part of the component 62e. For example, in a case where the component 62e represents the shape of the multi-function printer, only the completed paper tray part is displayed, or only 20% of the component 62e is displayed since the progress percentage is 20%. Of course, in a case where a plurality of components is developed in parallel, a diagram may be gradually generated and displayed according to the progress percentages of the separated components.

since the progress of each person in charge, the progress of each task, and the progress of the entire project are changed, the semantic diagram generation unit 28 intermittently regenerates (that is, updates) the semantic diagram 60, and the display control unit 30 displays the semantic diagram 60 updated whenever the semantic diagram 60 is updated. Accordingly, the content of the progress information 22 and the content of the semantic diagram 60 match each other, and it is possible to prevent a discrepancy between these contents.

A timing (a timing when the semantic diagram generation unit 28 regenerates the semantic diagram 60) when the display control unit 30 updates the semantic diagram 60 may be set by the user. For example, each person in charge intermittently inputs (updates) his or her business progress as stated above, but the display control unit 30 may update the semantic diagram 60 in a timing when any person in charge updates the business progress. The display control unit 30 may update the semantic diagram 60 in a timing when all the persons in charge of the task update the business progress for each task. Alternatively, a timing when the display control unit updates the semantic diagram 60 may be determined in advance. For example, the semantic diagram 60 can be set so as to be updated every morning (once a day), once every 3 days, or every Monday (once a week).

The display control unit 30 may display the semantic diagram 60 corresponding to the user who inputs the browsing request for the semantic diagram 60. Specifically, a browsable range in the progress information 22 is determined for each user, and the display control unit 30 may display the semantic diagram 60 representing the range browsable by the user who inputs the browsing request for the semantic diagram.

For example, in a case where a manager of the project corresponding to the progress information 22 can browse all the progress information items 22 and in a case where the manager inputs the browsing request for the semantic diagram 60 on the information processing apparatus 10, the display control unit 30 can display one or a plurality of semantic diagrams 60 representing all the progress information items 22. Meanwhile, in a case where a person in charge of a certain task within the project can browse only the progress related to the task engaged by the person in charge of the progress information 22, the display control unit 30 displays only the semantic diagram 60 which is related to the task engaged by the person in charge of the progress information 22.

The display control unit 30 may display the semantic diagram 60 related to only the selected person in charge among the plurality of users (persons in charge) included in the progress information 22. For example, it may be easy to grasp the progress of the entire project in a case where the plurality of semantic diagrams 60 representing the contents of the entire project indicated by the progress information 22 is displayed as shown in FIG. 14, and it may be difficult to grasp the progress of the person in charge or the situation of the business in a case where a specific person in charge is focused.

Accordingly, in a case where the specific person in charge among the plurality of persons in charge included in the progress information 22 is selected by the user, the semantic diagram generation unit 28 generates the semantic diagram 60 related to the selected person in charge. The semantic diagram 60 related to the selected person in charge is a diagram representing the progress percentage of the person in charge and the condition or problem of the person in charge in more detail. The display control unit 30 displays the semantic diagram 60 generated in this manner. Accordingly, the user can more easily grasp the progress of the specific person in charge.

The specific person in charge may be selected by an operation of the user for the displayed semantic diagram 60. For example, it is possible to select the person in charge by tapping the component 62 representing the person in charge.

It has been described in the exemplary embodiments that the processes proceed according to the instructions of the user. However, automatic execution may be applied by setting schedule information or task information of a target on which an automatic execution process is performed through robotic process automation (RPA). Of course, all the processes may not be automated, and automation process may be partially applied. Accordingly, it is possible to perform a repetitive operation while saving the user's effort or time for resetting.

While the exemplary embodiments according to the present invention have been described, the present invention is not limited to the exemplary embodiments. The exemplary embodiments can be modified in various manners without departing from the gist of the present invention. For example, in the exemplary embodiments, the components may be combined, or some components may be removed or added.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display; and
a processor, configured to:
extract contents from a plurality of events within a display target period in a schedule;
determine a relationship between the contents;
convert the plurality of events into a plurality of semantic diagrams, wherein each of the plurality of semantic diagrams comprises a plurality of components representing the contents of the corresponding event, and the plurality of components are associated with one another according to the relationship between the contents, wherein the plurality of semantic diagrams are editable by editing the plurality of components; and
display on the display the plurality of semantic diagrams arranged in an order of scheduled execution times within the display target period in the schedule, wherein
the processor performs the editing the plurality of components by removing one of the plurality of components from one of the plurality of semantic diagrams,
in response to removing the one of the plurality of components from the one of the plurality of semantic diagrams, the processor controls displaying a new semantic diagram which does not include the one of the plurality of components that has been removed, and the processor removes a content corresponding to the one of the plurality of components that has been removed,
wherein the contents of the plurality of events comprise a plurality of attendees and an agenda for a meeting performed by the plurality of attendees,
wherein the contents of the plurality of events further comprise a material comprising a document file, a voice file, or a video file to be used at the meeting,
wherein the plurality of components of the sematic diagrams comprise graphical icons or representations of the contents,
wherein the processor displays each of the plurality of semantic diagrams with a component indicating a scheduled execution time, and in a case where one event of the plurality of events is not completed within the scheduled execution time, the processor changes at least one of a content of the component indicating the scheduled execution time of the one event, or a content of the component indicating the scheduled execution time of a subsequent event to the one event,
wherein, in a case where a scheduled completion time of the one event or the subsequent event is determined not to be changeable; the processor does not change the scheduled completion time of the one event or the subsequent event that is determined not to be changeable in the component indicating the scheduled execution time of the one event or the subsequent event.

2. The information processing apparatus according to claim 1, wherein the processor displays each of the plurality of semantic diagrams with a size corresponding to a length of the scheduled execution time of a corresponding one of the plurality of events.

3. The information processing apparatus according to claim 1,
wherein the processor does not display semantic diagrams corresponding to some events in the display target period.

4. The information processing apparatus according to claim 3,
wherein the processor does not display a semantic diagram corresponding to an event of which a priority is relatively low even if the event is within the display target period.

5. The information processing apparatus according to claim 3,
wherein the processor does not display a semantic diagram corresponding to an event of which a priority is equal to or less than a threshold value even if the event is within the display target period.

6. The information processing apparatus according to claim 1,
wherein the processor does not display semantic diagrams corresponding to events set to be private in the schedule.

7. The information processing apparatus according to claim 1,
wherein the processor controls a display manner of each semantic diagram of the plurality of semantic diagrams according to an execution status of an event corresponding to the each semantic diagram.

8. The information processing apparatus according to claim 7,
wherein the processor displays a semantic diagram corresponding to an event being executed by a user in an identifiable form.

9. The information processing apparatus according to claim 8,
wherein the processor recognizes an event as being executed by the user if a scheduled execution time of the event includes a current time.

10. The information processing apparatus according to claim 8,
wherein the processor recognizes an event as being executed by the user if execution start information for the event is input by the user.

11. The information processing apparatus according to claim 7,
wherein the processor displays a semantic diagram corresponding to an event that is completed by the user in an identifiable form.

12. The information processing apparatus according to claim 11,
wherein the processor recognizes an event as completed by the user if the scheduled execution time of the event is before a current time.

13. The information processing apparatus according to claim 11,
wherein the processor recognizes an event as completed by the user if execution completion information for the event is input by the user.

14. The information processing apparatus according to claim 7,
wherein the processor displays a semantic diagram corresponding to an event in progress and hides a diagram corresponding to an event that is completed.

15. The information processing apparatus according to claim 1,
wherein the processor updates the plurality of semantic diagrams according to a change to the schedule.

16. The information processing apparatus according to claim 1,
wherein the plurality of semantic diagrams are editable by a user, and
information indicating the schedule is updated according to an edit made to the plurality of semantic diagrams.

17. The information processing apparatus according to claim 1,
wherein a shape of a display frame of the plurality of semantic diagrams varies according to content of one or more events corresponding to the plurality of semantic diagrams.

18. The information processing apparatus according to claim 1,
wherein a shape of a display frame of the plurality of semantic diagrams varies according to a shape of the display on which the plurality of semantic diagrams are displayed.

19. The information processing apparatus according to claim 1, wherein the processor first displays the plurality of semantic diagrams corresponding to the plurality of events, and, in response to an operation of a user, then displays a combination diagram obtained by combining the plurality of semantic diagrams.

20. The information processing apparatus according to claim 19,
wherein the processor displays the combination diagram including content of one semantic diagram and another semantic diagram.

21. The information processing apparatus according to claim 19, wherein, in a case where the user moves the one semantic diagram to a display region of the other semantic diagram on the display, the processor displays the combination diagram.

22. The information processing apparatus according to claim 1, wherein the plurality of events are texts-based events arranged based on the scheduled execution time of each of the plurality of events.

23. The information processing apparatus according to claim 1,
wherein the processor performs the editing the plurality of components by moving one of the plurality of components to an outside of a display region of one of the plurality of semantic diagrams by performing a drag operation on the one of the plurality of components being moved.

24. A non-transitory computer readable medium storing an information processing program causing a computer to function as:
a processor, configured to:
extract contents from a plurality of events within a display target period in a schedule;
determine a relationship between the contents;
convert the plurality of events into a plurality of semantic diagrams, wherein each of the plurality of semantic diagrams comprises a plurality of components representing the contents of the corresponding event, and the plurality of components are associated with one another according to the relationship between the contents, wherein the plurality of semantic diagrams are editable by editing the plurality of components; and
display on a display the plurality of semantic diagrams arranged in an order of scheduled execution times within the display target period in the schedule,
wherein the processor performs the editing the plurality of components by removing one of the plurality of components from one of the plurality of semantic diagrams,
in response to removing the one of the plurality of components from the one of the plurality of semantic diagrams, the processor controls displaying a new semantic diagram which does not include the one of the plurality of components that has been removed, and the processor removes a content corresponding to the one of the plurality of components that has been removed,
wherein the contents of the plurality of events comprise a plurality of attendees and an agenda for a meeting performed by the plurality of attendees,
wherein the contents of the plurality of events further comprise a material comprising a document file, a voice file, or a video file to be used at the meeting,
wherein the plurality of components of the sematic diagrams comprise graphical icons or representations of the contents,
wherein the processor displays each of the plurality of semantic diagrams with a component indicating a scheduled execution time, and in a case where one event of the plurality of events is not completed within the scheduled execution time,
the processor changes at least one of a content of the component indicating the scheduled execution time of the one event, or a content of the component indicating the scheduled execution time of a subsequent event to the one event,
wherein, in a case where a scheduled completion time of the one event or the subsequent event is determined not to be changeable, the processor does not change the scheduled completion time of the one event or the subsequent event that is determined not to be changeable in the component indicating the scheduled execution time of the one event or the subsequent event.

* * * * *